US008654303B2

(12) United States Patent
Nakanishi

(10) Patent No.: US 8,654,303 B2
(45) Date of Patent: Feb. 18, 2014

(54) LIQUID CRYSTAL DISPLAY DEVICE

(75) Inventor: Yohei Nakanishi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 1100 days.

(21) Appl. No.: 12/663,790

(22) PCT Filed: May 23, 2008

(86) PCT No.: PCT/JP2008/059577
§ 371 (c)(1),
(2), (4) Date: Dec. 9, 2009

(87) PCT Pub. No.: WO2009/004869
PCT Pub. Date: Jan. 8, 2009

(65) Prior Publication Data
US 2010/0188621 A1 Jul. 29, 2010

(30) Foreign Application Priority Data

Jul. 3, 2007 (JP) .................................. 2007-175314

(51) Int. Cl.
*G02F 1/1335* (2006.01)
(52) U.S. Cl.
USPC ............................ 349/167; 349/107; 349/117
(58) Field of Classification Search
USPC ......................................... 349/167, 117, 107
See application file for complete search history.

(56) References Cited

U.S. PATENT DOCUMENTS

| 5,774,197 A | 6/1998 | Nakamura |
| 2002/0140888 A1 | 10/2002 | Nishiyama et al. |
| 2003/0011732 A1 | 1/2003 | Ishihara et al. |
| 2004/0125323 A1 | 7/2004 | Park et al. |
| 2004/0226094 A1* | 11/2004 | Heimbrock et al. ............... 5/618 |
| 2006/0152659 A1 | 7/2006 | Ishihara et al. |
| 2006/0221283 A1 | 10/2006 | Nakao et al. |
| 2007/0076144 A1* | 4/2007 | Okita et al. .................. 349/107 |
| 2007/0146599 A1* | 6/2007 | Uchida et al. ................ 349/129 |
| 2007/0273816 A1* | 11/2007 | Kitagawa et al. ............. 349/118 |

FOREIGN PATENT DOCUMENTS

| JP | 11-249126 | 9/1999 |
| JP | 2001-117100 | 4/2001 |
| JP | 2001-290149 | 10/2001 |
| JP | 2002-148584 | 5/2002 |
| JP | 2002-350901 | 12/2002 |
| JP | 2001-156743 | 5/2003 |
| JP | 2003-156743 | 5/2003 |
| JP | 2003-241155 | 8/2003 |
| JP | 2006-91151 A | 4/2006 |
| JP | 2006-194924 A | 7/2006 |

* cited by examiner

*Primary Examiner* — Michael Caley
(74) *Attorney, Agent, or Firm* — Nixon & Vanderhye P.C.

(57) ABSTRACT

A liquid crystal display device of the present invention is arranged such that a retardation of a liquid crystal layer which obtained while no voltage is applied falls within ±(a value which is one-tenth of a main wavelength) of a value obtained by adding natural number times the main wavelength to a total retardation of at least one optical compensation film. This allows suppression of a transmittance during no voltage application.

14 Claims, 19 Drawing Sheets

F I G. 2
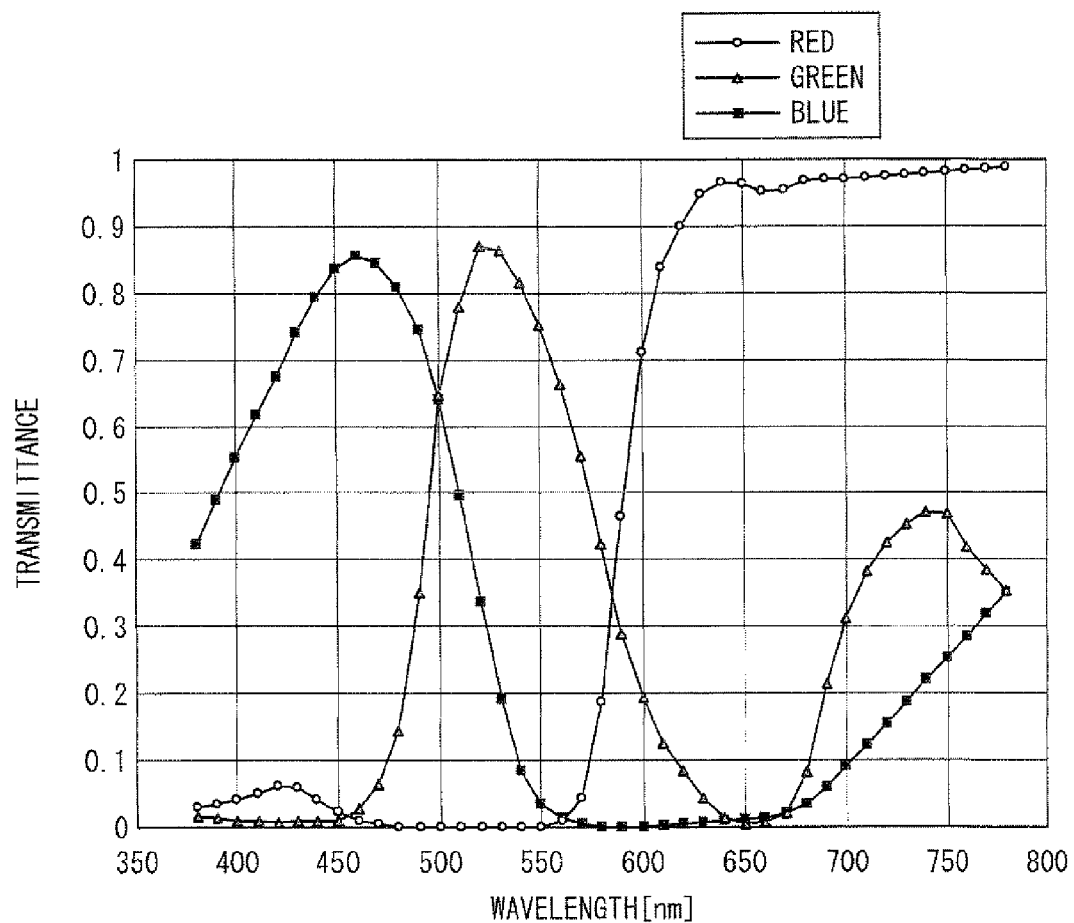

F I G. 3
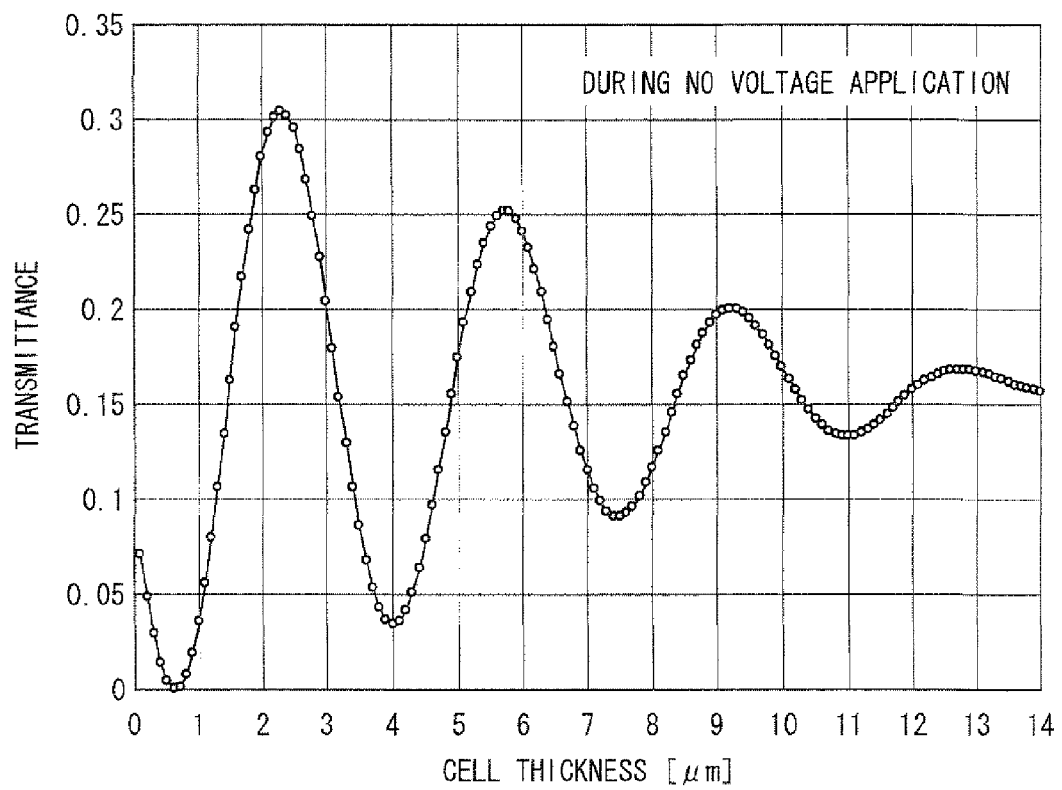

F I G. 4
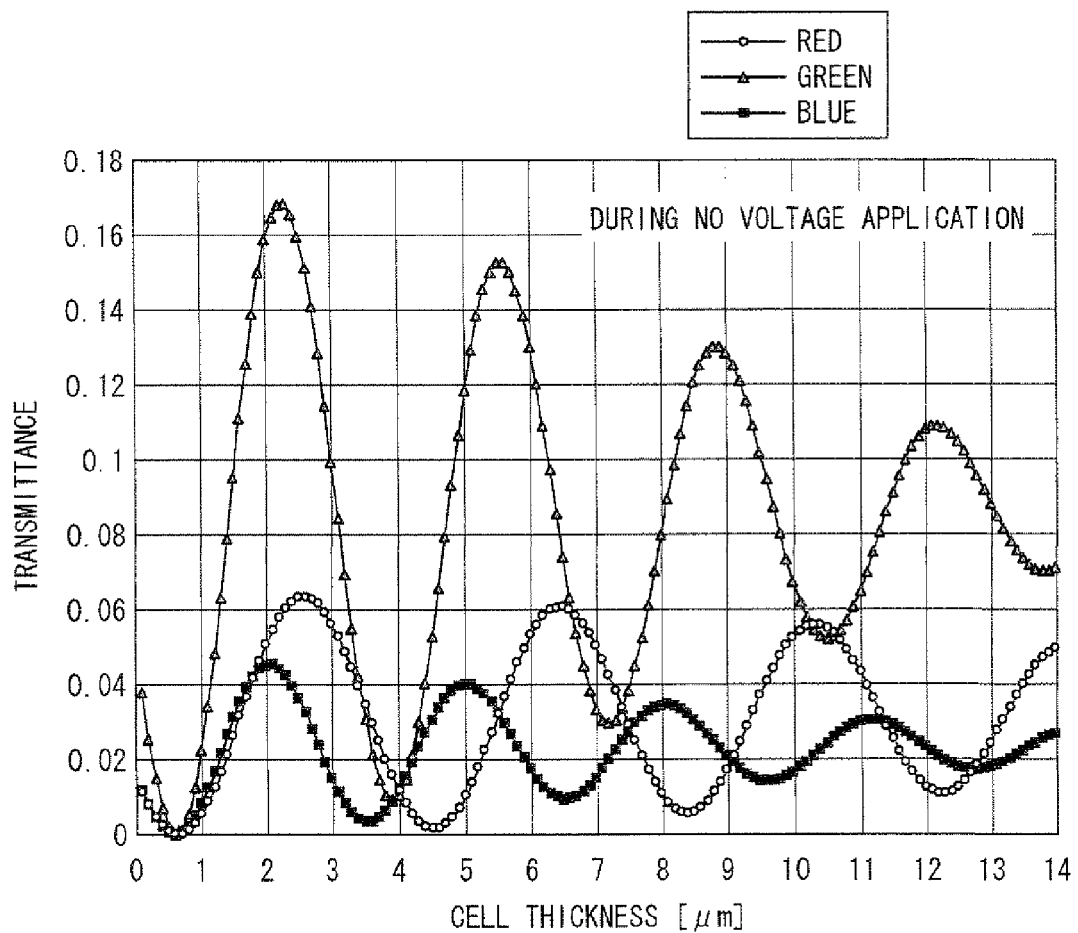

F I G. 5
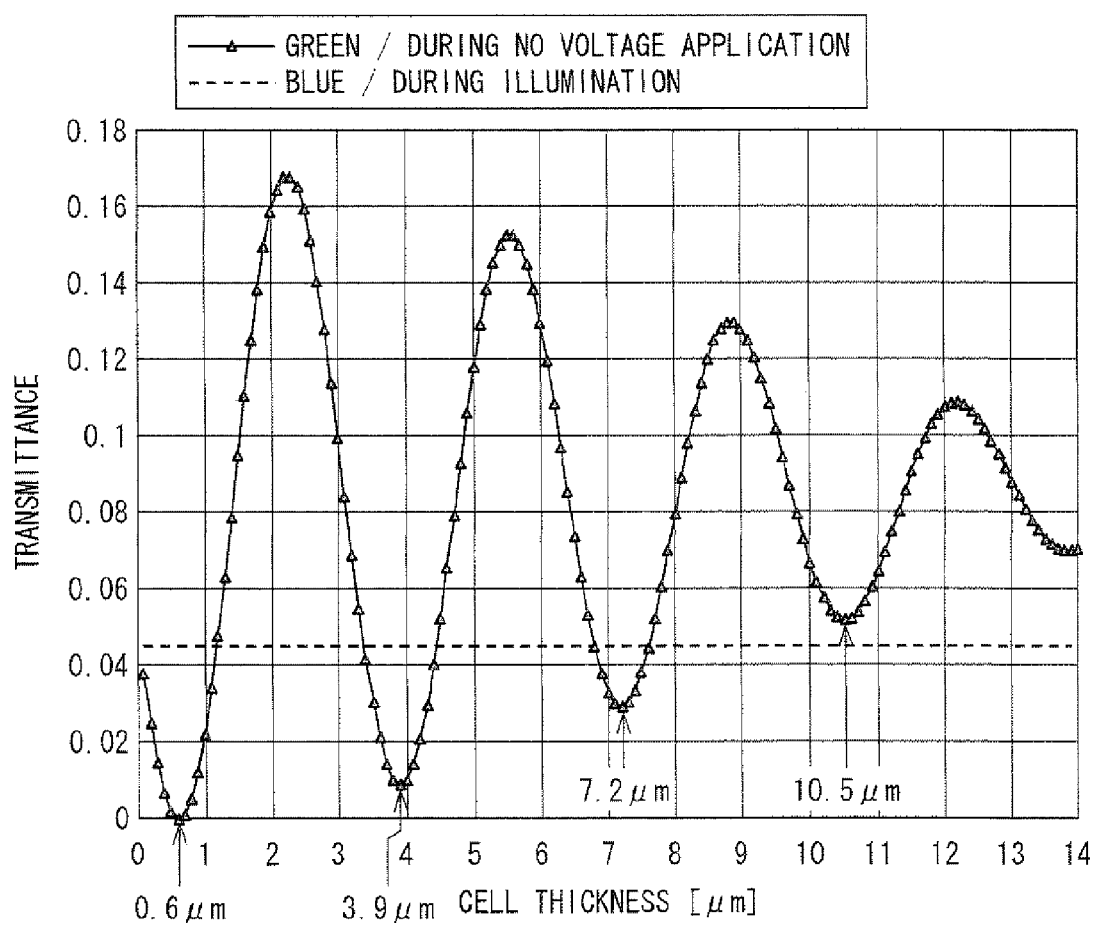

F I G. 8
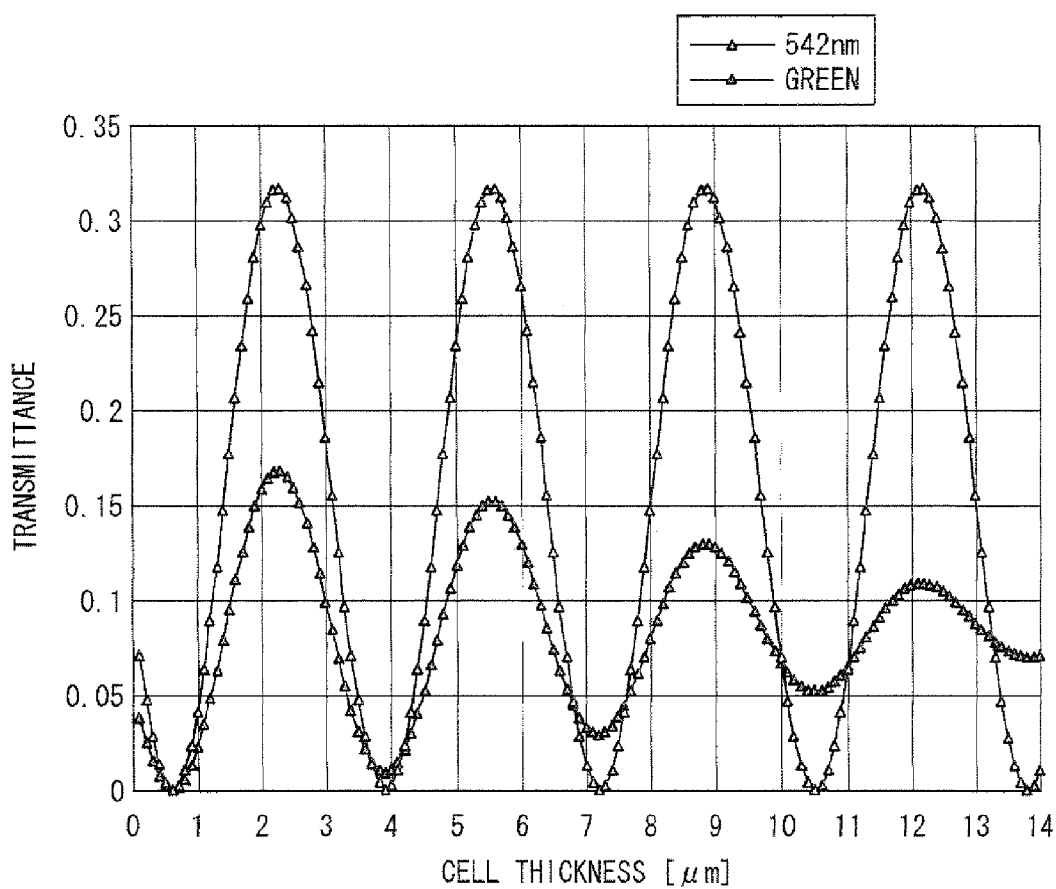

F I G. 1 2
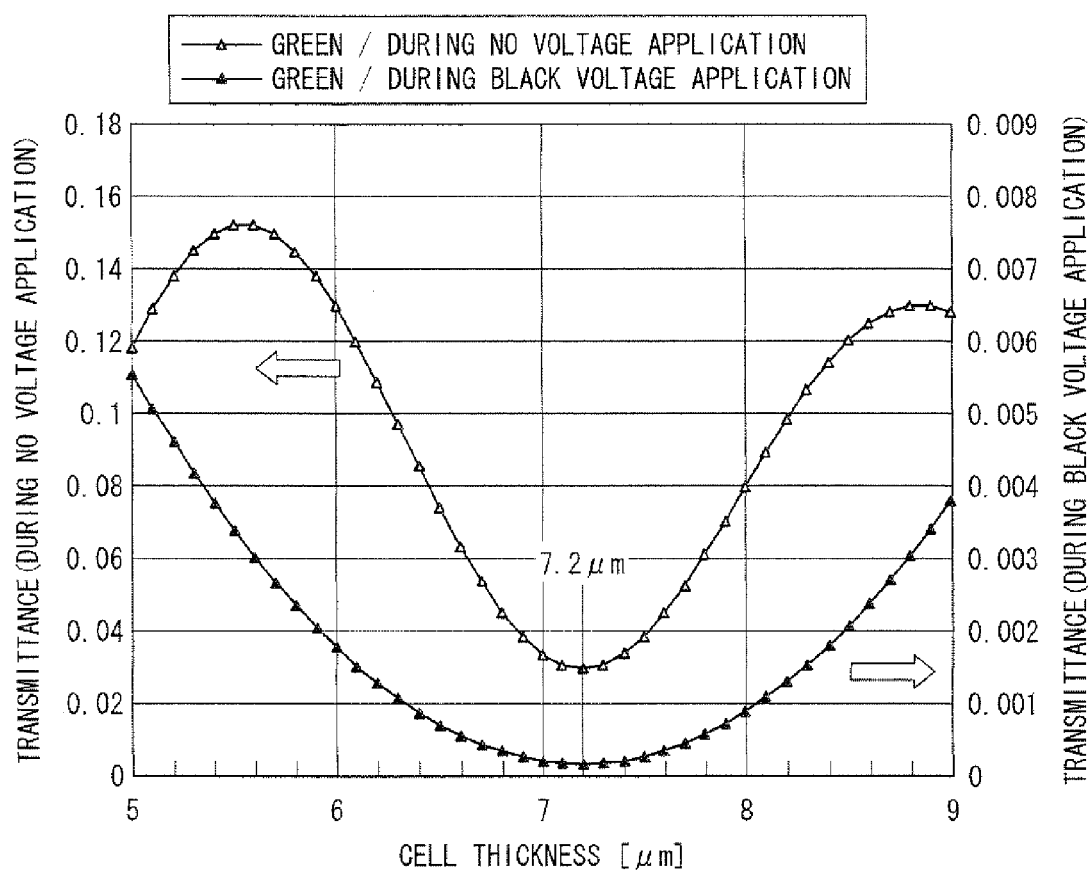

F I G. 1 3
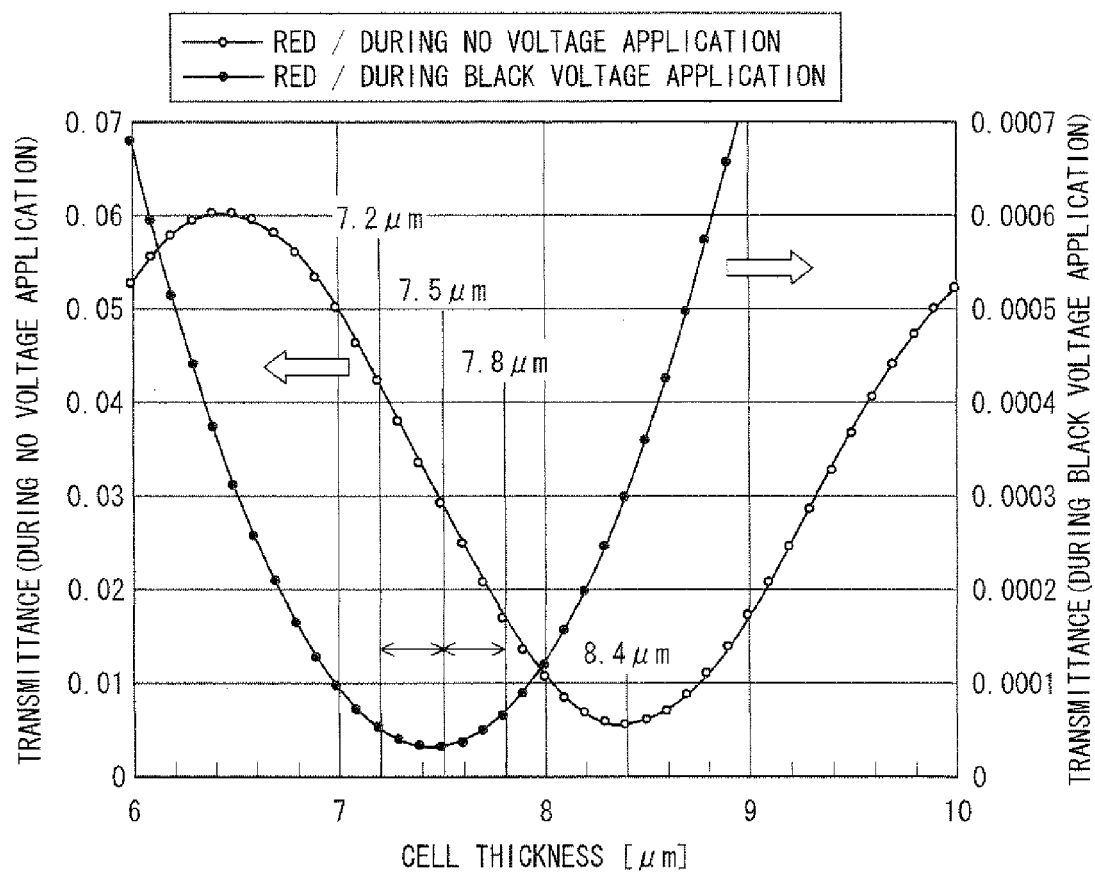

F I G. 14
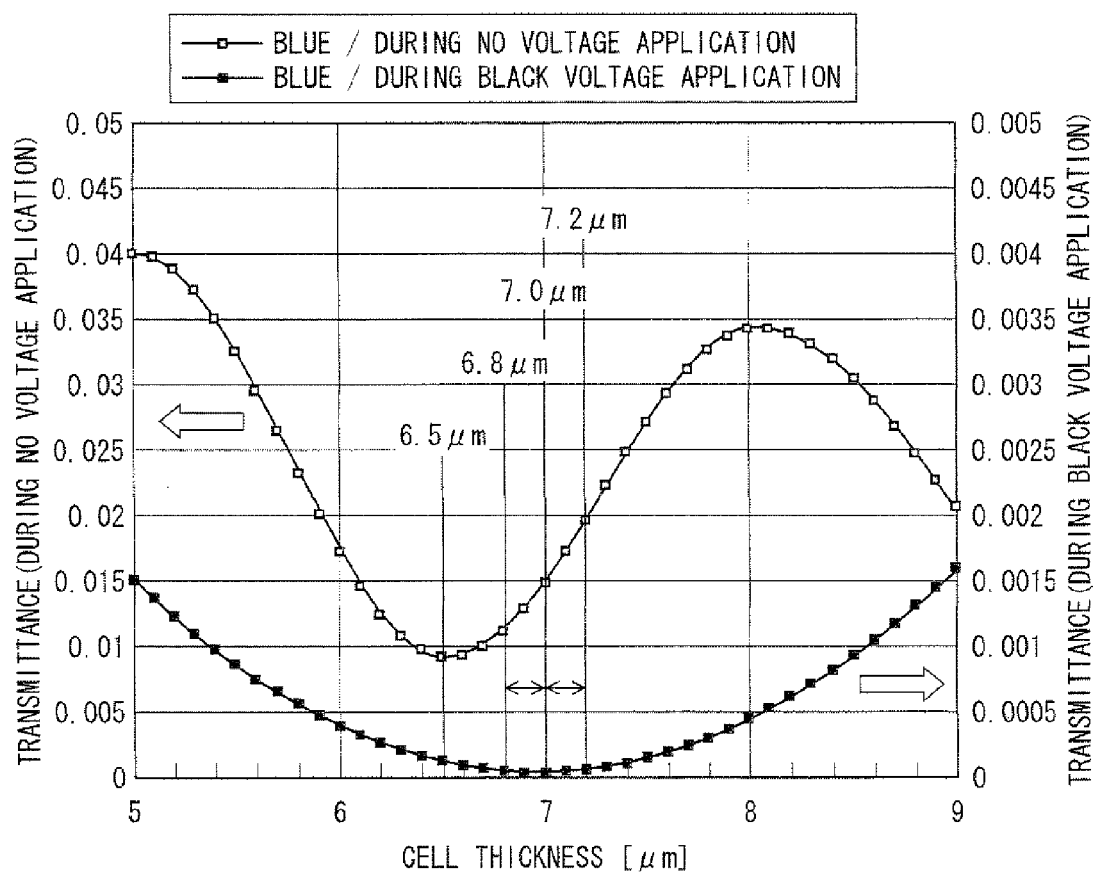

F I G. 1 9
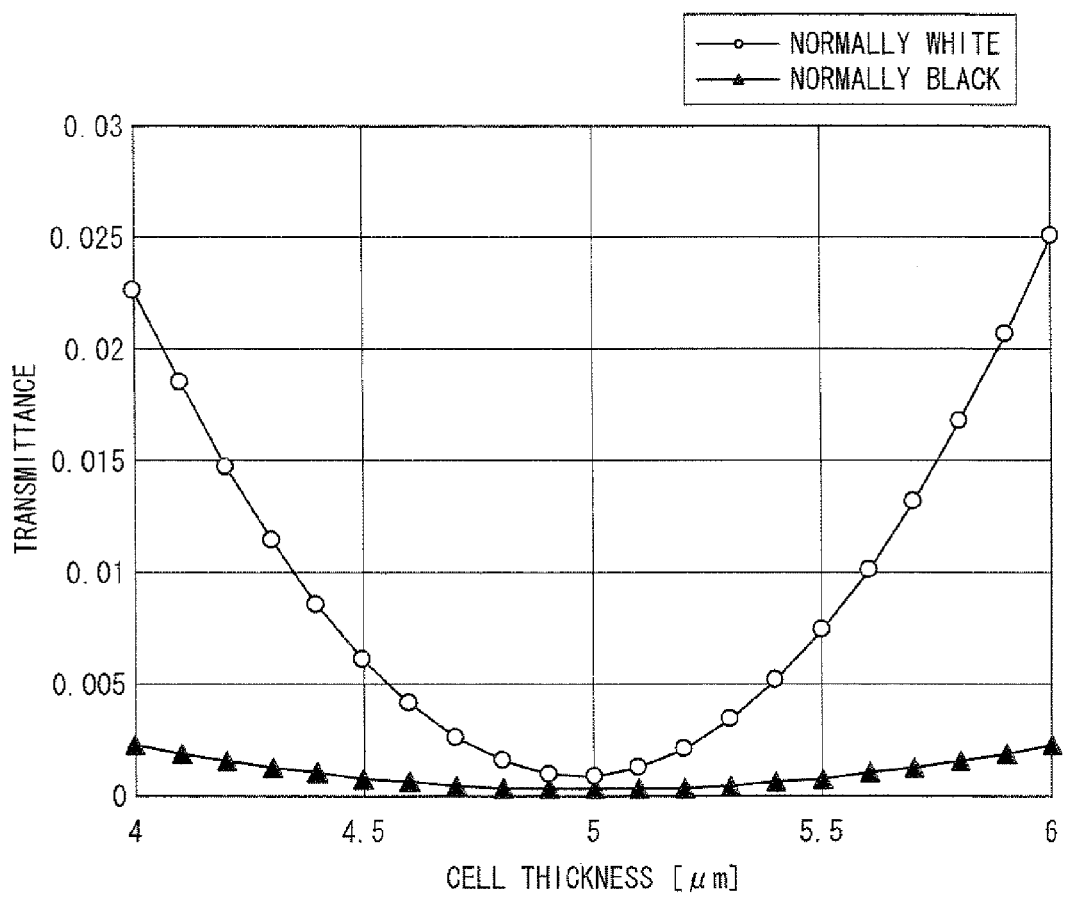

LIQUID CRYSTAL DISPLAY DEVICE

This application is the U.S. national phase of International Application No. PCT/JP2008/059577, filed 23 May 2008, which designated the U.S. and claims priority to Japanese Patent Application No. 2007-175314, filed 3 Jul. 2007, the entire contents of each of which are hereby incorporated by reference.

TECHNICAL FIELD

The present invention relates to a liquid crystal display device, particularly to a liquid crystal display device having an OCB (Optically Self-Compensated Birefringence type) liquid crystal display panel.

BACKGROUND ART

Conventionally, a liquid crystal display device has been used in various electronic devices such as a television set, a laptop PC (Personal Computer), a desktop PC, a PDA (Personal Digital Assistant: a mobile terminal), and a mobile phone. This is because the liquid crystal display device has the following advantages: (i) it is thinner and lighter than a CRT (Cathode Ray Tube)-based display and (ii) it can be driven at a low voltage, and (iii) it can realize lower power consumption.

A liquid crystal display device in which TFT (Thin Film Transistor) elements are used realizes a high display quality since all pixels are driven via respective TFT elements.

Meanwhile, it is rapidly becoming popular to display a moving picture by use of a liquid crystal display device in a television receiver or the like. In view of the circumstances, it is necessary to further increase a response speed of a liquid crystal display panel in the liquid crystal display device so that a moving picture can be finely displayed.

Against a backdrop of this, recently, it is a liquid crystal display device having an OCB (Optically Self-Compensated Birefringence type) liquid crystal display panel that has recently gained particular public attention.

(Arrangement of OCB Panel)

According to the liquid crystal display device having such an OCB liquid crystal display panel, liquid crystal molecules are provided between two substrates each of which is subjected to an alignment treatment which causes the liquid crystal molecules to be aligned in parallel to each other and in an identical direction. Wave plates are provided on respective surfaces of the two substrates. Polarizing plates are further provided on the respective surfaces of the two substrates so as to be in a crossed Nicols relationship between the polarizing plates. A negative wave plate whose main axes are hybridly aligned is used as each of the wave plates.

The following specifically describes an arrangement of a liquid crystal display device 1 having an OCB liquid crystal display panel and an orientation of liquid crystal molecules with reference to FIGS. 16 and 17. FIGS. 16 and 17 are schematic cross-sectional views each illustrating an arrangement of a liquid crystal display device 1 having the OCB liquid crystal display panel. FIG. 16 illustrates how liquid crystal molecules 52 are aligned during no voltage application, whereas FIG. 17 illustrates how the liquid crystal molecules 52 are aligned during voltage application.

A liquid crystal display panel 5 of the liquid crystal display device 1 includes a first substrate 10 and a second substrate 20 (see FIGS. 16 and 17). The first substrate 10, which serves as a TFT substrate (active matrix substrate), includes a first glass substrate 11 on which (i) a wiring layer 13 including TFT (Thin Film Transistor) elements and the like, (ii) an insulating layer 15, (iii) pixel electrodes 17, and (iv) a first alignment film 19 are provided. The second substrate 20, which serves as a counter substrate, includes a second glass substrate 21 on which a color filter 23, a counter electrode 27, and a second alignment film 29 are provided. Furthermore, a liquid crystal layer 50 including the liquid crystal molecules 52 is provided between the first substrate 10 and the second substrate 20.

Furthermore, a first optical compensation film (wave plate) 41 and a first polarizing plate 43 are provided on a surface of the first glass substrate 11 which surface is opposite to a surface on which the wiring layer 13 is provided. A second optical compensation film (wave plate) 45 and a second polarizing plate 47 are provided on a surface of the second glass substrate 21 which surface is opposite to a surface on which the color filter 23 is provided.

A backlight 70 is provided on a back side of the liquid crystal display panel 5.

More specifically, each of the first alignment film 19 and the second alignment film 29 is subjected to an alignment treatment by rubbing (a rubbing alignment treatment). As described later, the alignment treatment is carried out by rubbing the surfaces of the two substrates (the TFT substrate and the counter substrate) which surfaces face each other in an identical direction so that the liquid crystal molecules 52 have a spray orientation during no voltage application, whereas the liquid crystal molecules 52 have a bend orientation during voltage application.

Further, the polarizing plates (the first polarizing plate 43 and the second polarizing plate 47) which are attached to respective surfaces of the two substrates are arranged so that their optical axes are at respective angles of 45° and 135° (are in a crossed Nicols relationship) with respective orientation directions in which the liquid crystal molecules 52 on the surfaces of the respective substrates, that is, with a direction in which the rubbing alignment treatment is carried out.

Each of the liquid crystal molecules 52 included in the liquid crystal layer 50 generally has positive dielectric anisotropy. Note here that the liquid crystal molecule 52 having positive dielectric anisotropy refers to the one which has a characteristic in which a major axis direction of the liquid crystal molecule 52 is parallel to an electric field generated by a voltage while the voltage is being applied to the liquid crystal molecule 52.

Furthermore, the liquid crystal display device 1 includes the TFT elements for causing the liquid crystal layer 50 to be subjected to an active matrix driving. The TFT elements are provided in respective pixels, and each of the respective pixels is connected to a corresponding gate bus line and a corresponding source bus line (not illustrated) each provided on the first glass substrate.

Note that the first glass substrate 11 and the second glass substrate 21 are combined by use of sphere spacers or columnar spacers so as to be away, by a predetermined distance, from each other.

(Orientations of Liquid Crystal Molecules)

The following specifically describes orientations of the liquid crystal molecules 52 in the OCB liquid crystal display panel. The liquid crystal display device 1 having the OCB liquid crystal display panel is employed is arranged such that: the liquid crystal molecules 52 have a spray orientation during no voltage application (see FIG. 16), and the spray orientation is changed to a bend orientation during voltage application (this change is referred to as a spray-bend transition) (see FIG. 17). Then, display is carried out during the bend orientation by changing tilt angles of the respective liquid crystal molecules 52.

More specifically, right after the liquid crystal molecules 52 are filled between the first substrate 10 and the second substrate 20, the liquid crystal molecules 52 have the spray orientation (an initial orientation) in which the liquid crystal molecules 52 are substantially parallel to the first substrate 10 (see FIG. 16). Note that application of a voltage to the liquid crystal molecules 52 generally causes a transition of the liquid crystal molecules 52 from the spray orientation to the bend orientation. Namely, in a case where a relatively high voltage (e.g. 25V) is applied to the liquid crystal molecules 52 which have the spray orientation, a transition to the bend orientation occurs. The liquid crystal molecules 52 provided in a display surface have sequential transitions from spray orientation to bend orientation (see FIG. 17).

As described earlier, an actual display is carried out in a bend orientation state in the liquid crystal display device 1 having the OCB liquid crystal display panel. Therefore, it is necessary that such a spray-bend transition occur every time the liquid crystal display device 1 is turned on.

(Actual Display)

As described earlier, an actual display is carried out after a spray-bend transition has been completed, that is, in a bend orientation state. Specifically, an actual display is carried out in the following manner, for example.

Namely, in a case where an ON voltage of a voltage for normal display (a display voltage) is applied to the liquid crystal molecules 52 which is in a bend orientation state, the liquid crystal molecules 52 are caused to orient in a direction more perpendicular to the two substrates than in a case where an OFF voltage of the display voltage is applied to the liquid crystal molecules 52. In other words, the liquid crystal molecules 52 are caused to be at more right angles with the two substrates.

In any case, a white display and a black display are carried out in accordance with a change in angles of the respective liquid crystal molecules 52 in the bend orientation state.

Note that it is necessary to apply a voltage which falls within a given range to the liquid crystal molecules so as to cause the liquid crystal display device to be driven. In a case where the liquid crystal display device has an OCB liquid crystal display panel, means for initially applying an extremely high voltage (e.g. around 25V) is generally provided so that the liquid crystal molecules are subjected to a transition from spray orientation to bend orientation.

Note that the lowest voltage and the highest voltage, in a range of a display voltage obtained by removing such a high voltage, are referred to as an OFF voltage and an ON voltage, respectively. In a normally white liquid crystal display panel, a white display is carried out while the OFF voltage is being applied, whereas a black display is carried out while the ON voltage is being applied.

(Optical Compensation Film)

An optical compensation film is generally used in the liquid crystal display device 1 having the OCB liquid crystal display panel.

An object of using the optical compensation film is to obtain a greater viewing angle. Specifically, for example, Patent Literature 1 discloses a technique in which: a phase difference compensation film (an optical compensation film) corrects a phase difference caused by two planes other than an X-Z plane of a cell in which a bend orientation occurs, so as to make such a phase difference be zero (0). Note here that an X-axis, a Y-axis, and a Z-axis are defined so that an X-Y plane is a display surface of a liquid crystal display device and the Z-axis is perpendicular to the display surface.

Another object of using the optical compensation film is to improve a quality of a black display, for example, in a normally white mode. The following describes this point.

(Residual Retardation)

For example, in a case where a black display is carried out in the normally white mode, an application of the ON voltage causes the liquid crystal molecules 52 in a bulk (a region away from the two substrates) to be easy to orient perpendicularly to the two substrates. On the other hand, the liquid crystal molecules 52 in the vicinity of surfaces of the respective two substrates, specifically in the vicinity of the alignment films (the first alignment film 19 and the second alignment film 29) are difficult to orient perpendicularly to the two substrates. This is because the force is exerted on the liquid crystal molecules 52 by the alignment films.

Namely, the liquid crystal molecules 52 on the surfaces of the respective two substrates are brought into contact with the alignment films, so as to have a given pretilt angle. This causes components existing in a direction parallel to the two substrates to remain in directors of the liquid crystal molecules in the vicinity of the two substrates even while a voltage is being applied.

As a result, a retardation of the entire liquid crystal layer 50 is not completely zero even while the ON voltage is being applied to the liquid crystal layer 50. This is because a retardation remains due to the liquid crystal molecules having respective director components in the direction parallel to the two substrates (this is referred to as a residual retardation).

In a case where the residual retardation exists, light is not blocked only by the polarizing plates (the first polarizing plate 43 and the second polarizing plate 47) which are provided so as to be in the crossed Nicols relationship. This makes it impossible to satisfactorily obtain a black display.

In view of the problem, a technique of using an optical compensation film has been suggested for removing the residual retardation. For example, Patent Literature 2 discloses a method for compensating for light by inserting an optical compensation film as a method for preventing a light leakage during a black display.

According to the method in which this optical compensation film is used, a black display is realized by offsetting a retardation in a liquid crystal layer. The offsetting is realized by providing an optical compensation film between a polarizing plate and a liquid crystal display panel so that the optical compensation film has a slow axis perpendicular to a direction in which liquid crystal molecules orient. Namely, the use of the optical compensation film causes a total of a retardation of the liquid crystal layer and a retardation of a phase difference layer (the optical compensation film) to be substantially zero (0), thereby reducing a light leakage.

Note that the description is premised on a normally white mode (hereinafter referred to as a NW mode) in which a black display is carried out during high voltage application whereas a white display is carried out during low voltage application. However, the present embodiment is not limited to this. Alternatively, by changing a design of a polarizing plate and/or an optical compensation film, it is possible to realize a normally black mode (hereinafter referred to as a NB mode) in which a white display is carried out during high voltage application whereas a black display is carried out during low voltage application.

Furthermore, Patent Literature 3 discloses a technique for improving a front contrast, in which method an adjustment is carried out with respect to (i) a retardation of an optical compensation film used on a front surface side of a liquid crystal display panel and (ii) a retardation of an optical compensation film used on a rear surface side of the liquid crystal display panel.

CITATION LIST

Patent Literature 1
Japanese Patent Application Publication, Tokukaihei, No. 9-230332 A (Publication Date: Sep. 5, 1997)
Patent Literature 2
Japanese Patent Application Publication, Tokukai, No, 2002-357827 A (Publication Date: Dec. 13, 2002)
Patent Literature 3
Japanese Patent Application Publication, Tokukai, No. 2003-156743 A (Publication Date: May 30, 2003)

SUMMARY OF INVENTION

However, there occurs a problem that a defective pixel is likely to be noticeable in the conventional arrangements in which a transmittance of the defective pixel is not taken into consideration.

Namely, for example, in a case of a liquid crystal display device in which TFT elements (Thin Film Transistors) are used as switching elements for respective pixels, a defect in one (1) TFT element or a short-circuit between upper and lower electrodes in one (1) pixel makes it totally impossible to drive such one (1) pixel. Such a pixel is sometimes noticeable as a defective pixel. The following describes this point.

Generally, a liquid crystal display device includes at least several tens of thousands of pixels. In especial, a recent large-scale liquid crystal display device includes around ten million pixels. In a TFT liquid crystal display device in which TFT elements each serving as a switching element are provided in respective pixels, TFT elements provided in a single liquid crystal display device and the pixels are identical in number.

Such enormous numbers of TFT elements may cause several TFT element defects and eventually produce several TFT element defective pixels in a single liquid crystal display device.

Moreover, contamination with a foreign matter or the like may cause an electrical short-circuit between upper and lower substrates even if TFT elements normally function.

Note that it is impossible to apply a voltage to liquid crystal molecules in: (i) a pixel (TFT element defective pixel) in which a TFT element is defective (hereinafter referred to as a TFT element defect) or (ii) a pixel (a short-circuited pixel) in which upper and lower substrates are short-circuited (hereinafter referred to as an upper and lower short-circuit).

As a result, in a case of a normally white (NW) liquid crystal display device, the TFT element defective pixel or the short-circuited pixel is fixed as a bright dot. Therefore, the bright dot is likely to be recognizable as a bright dot defect especially during a full-screen black display.

In a case where one or several of several million pixels has (have) bright dot defect(s), for example, only a single bright dot existing in an entirely black screen frequently allows an observer of the liquid crystal display device to easily recognize a bright dot defect. On the other hand, in a case of a normally black (NW) liquid crystal display device, the TFT element defective pixel or the short-circuited pixel is fixed as a black dot. Therefore, the black dot is likely to be recognizable as a black dot defect especially during a full-screen white display.

A small black dot existing in an entirely white screen allows an observer of the liquid crystal display device to easily recognize the black dot defect, although the black dot defect is less noticeable than the bright dot defect recognized in the normally white liquid crystal display device.

As for the defects, it is difficult for the OCB liquid crystal display panel to cause the TFT element defective pixels or the short-circuited pixels to be less noticeable during display even in the normally black liquid crystal display device, not to mention in the normally white liquid crystal display device.

(Applied Voltage and Transmittance)

The following more specifically describes a relationship between an applied voltage and, a transmittance in the OCB liquid crystal display panel with reference to FIG. 18. FIG. 18 is an example of a voltage-transmittance characteristic obtained in a case where different optical compensation films are attached to a single liquid crystal display panel in which a bend orientation occurs during voltage application. Note here that a transmittance and a luminance (a.u.) have a parallel relationship. Namely, FIG. 18 shows respective optical characteristics of a normally white liquid crystal display device and a normally black liquid crystal display device which are produced by use of respective different optical compensation films.

Note that a transverse axis and a vertical axis indicate (i) a voltage applied to a liquid crystal layer and (ii) a transmittance, respectively (see FIG. 18). Note also that a circle and a triangle indicate (i) a transmittance of the normally white liquid crystal display device and (ii) a transmittance of the normally black liquid crystal display device, respectively (see FIG. 18).

Use of a single liquid crystal display panel allows a realization of both the normally white liquid crystal display device and the normally black liquid crystal display device (see FIG. 18). Namely, it is possible to use a single liquid crystal display panel in two ways of the normally white liquid crystal display device and the normally black liquid crystal display device by changing respective angles at which an optical compensation film and a polarizing plate are attached to the single liquid crystal display panel.

Further, as illustrated in FIG. 19, which illustrates a cell thickness dependence of a black luminance, it is possible to carry out an almost identical black display both in the normally white liquid crystal display device and in the normally black liquid crystal display device.

Note that a voltage-transmittance characteristic becomes discontinuous at around 1.8V irrespective of the normally white liquid crystal display device or the normally black liquid crystal display device. This is because a transition occurs from a spray orientation to a bend orientation at a voltage of not less than 1.8V which is a transition voltage.

As described earlier, in the OCB liquid crystal display device, an actual display is carried out while a higher voltage than the transition voltage is being applied, whereas pixels to which a lower voltage than the transition voltage is applied do not contribute to the actual display.

For example, in the normally white liquid crystal display device, it is clear from FIG. 18 that a transmittance obtained during no voltage application is approximately 0.22 and therefore a bright, dot defect may occur in a case where no voltage is applied to liquid crystal molecules.

The present invention has been made in view of the problems, and its object is to obtain an OCB liquid crystal display device in which a defective pixel is prevented from being noticeable during display.

Specifically, the object is to obtain a Normally White liquid crystal display device which is capable of preventing a bright dot defect from being noticeable.

In order to solve the problems, an OCB liquid crystal display device of the present invention, includes: first and second substrates provided to face each other; a liquid crystal layer provided between the first and second substrates; polarizing plates provided on first surfaces of the respective first and second substrates which first surfaces are opposite to respective second surfaces of the first and second substrates which second surfaces face the liquid crystal layer; at least one optical compensation film provided between (i) at least one of the first and second substrates and (ii) a corresponding one of the polarizing plates, the liquid crystal layer including liquid crystal molecules having a spray orientation in a state where no voltage is applied to the liquid crystal layer, a transition occurring to a bend orientation from the spray orientation in response to application of a voltage to the liquid crystal layer, and a retardation of the liquid crystal layer obtained while no voltage is applied to the liquid crystal layer falling within ± (a value which is one-tenth of a main wavelength) of a value obtained by adding natural number times the main wavelength to a total retardation of the at least one optical compensation film.

According to the arrangement, the retardation of the liquid crystal layer obtained while no voltage is applied is within ±10% of the value obtained by adding natural number times the main wavelength to the total retardation of the at least one optical compensation film (in a case where a plurality of optical compensation films are used, the total retardation refers to a total of retardations of the respective plurality of optical compensation films). Accordingly, a state of polarization of light emitted through the liquid crystal layer to which no voltage is applied is difficult to change by the light which transmits at least one optical compensation film. Particularly in a case where the retardation of the liquid crystal layer to which no voltage is applied coincides with the value obtained by adding natural number times the main wavelength to the total retardation of the at least one optical compensation film, the state of polarization of the light emitted through the liquid crystal layer to which no voltage is applied is unchanged by the light which transmits the at least one optical compensation film.

As a result, in a case where the retardation of the liquid crystal layer is set so that the liquid crystal layer has a minimal (extreme) transmittance with respect to the light emitted through the liquid crystal layer to which no voltage is applied, the transmittance with respect to the light emitted through the liquid crystal layer is difficult to change even if the light emitted through the liquid crystal layer transmits the at least one optical compensation film.

As a result, even in a liquid crystal display device in which an optical compensation film is used, it is possible to minimize an amount of light emitted through a liquid crystal layer corresponding to the pixel in which a TFT element is defective or the pixel in which upper and lower substrates are short-circuited, that is, a liquid crystal layer to which no voltage is applied.

Accordingly, a liquid crystal display device of the present invention allows a defective pixel which is a region of a liquid crystal layer to which region no voltage is applied to be less noticeable during display in a liquid crystal display device having the OCB liquid crystal display panel.

Note that minimizing an amount of light emitted through a liquid crystal layer refers to allowing the defective pixel to be less noticeable in a case of a normally white liquid crystal display device.

Namely, it is preferable that a liquid crystal layer to which no voltage is applied have a minimum extreme transmittance. This is because light emitted through the liquid crystal layer to which no voltage is applied is recognized as a bright dot in a dark screen during a full-screen On-voltage application in the normally white liquid crystal display device.

Furthermore, it is preferable that the main wavelength be set to a wavelength corresponding, for example, to green light, which human eyes feel the most intense, specifically, 542 nm or 546.1 nm.

Moreover, the retardation is the product of a reflective index anisotropy of liquid crystal molecules and a thickness of a liquid crystal layer. Therefore, optimization of (i) a liquid crystal material and (ii) the thickness of the liquid crystal layer allows a realization of a desired retardation.

Note that the reason why some room of ± (the value which is one-tenth of a main wavelength) is provided for a range of the retardation of the liquid crystal layer is that (i) a cell thickness may change by around ±0.3 μm, for example during production of a liquid crystal display device and (ii) it is possible to obtain an effect of the present invention even if the cell thickness changes to that extent.

Namely, though the change in cell thickness by ±0.3 μm causes the retardation to change by around one tenth of the main wavelength, it is possible to attain the object of the present invention even if such a change in retardation occurs.

The OCB liquid crystal display device of the present invention is arranged such that the total retardation of the at least one optical compensation film is within ±10% of a retardation of the liquid crystal layer obtained while an ON voltage is being applied to the liquid crystal layer during display.

According to the arrangement, the total retardation of the at least one optical compensation film is within ±10% of the retardation of the liquid crystal layer obtained while the ON voltage is being applied to the liquid crystal layer during display, that is, within ±10% of a residual retardation. This allows prevention of a light leakage in the normally white liquid crystal display device.

Note that the residual retardation refers to a retardation made by liquid crystal molecules on a surface of a substrate which do not orient in a direction of an electric field generated by a voltage applied to a liquid crystal layer (described earlier).

The OCB liquid crystal display device of the present invention is arranged such that: said at least one of the first and second substrates includes a color filter which includes at least a green color filter, and a retardation of the liquid crystal layer in a region corresponding to the green color filter which retardation is obtained while no voltage is applied, falls within ± (a value which is one-tenth of a main wavelength of light which transmits the green color filter) of a value obtained by adding, to the total retardation of the at least one optical compensation film, natural number times the main wavelength of the light which transmits the green color filter.

According to the arrangement, it is easy to cause a region which green light, for example, which human eyes feel the most intense transmits to have a maximum or minimum (an extreme) transmittance during no voltage application.

This allows a defective pixel which is a region of a liquid crystal layer to which region no voltage is applied to be much less noticeable.

The OCB liquid crystal display device of the present invention is arranged such that: said at least one of the first and second substrates includes a color filter which includes a red color filter, a green color filter, and a blue color filter, a retardation of the liquid crystal layer in a region corresponding to the red color filter which retardation is obtained while no voltage is applied, falls within ± (a value which is one-tenth of a main wavelength of light which transmits the red color filter) of a value obtained by adding, to the total retardation of the at least one optical compensation film, natural number times the main wavelength of the light which transmits the red color filter, a retardation of the liquid crystal layer in a region corresponding to the green color filter which retardation is obtained while no voltage is applied, falls within ± (a value which is one-tenth of a main wavelength of light which transmits the green color filter) of a value obtained by adding, to the total retardation of the at least one optical compensation film, natural number times the main wavelength of the light which transmits the green color filter, and a retardation of the liquid crystal layer in a region corresponding to the blue color filter which retardation is obtained while no voltage is applied, falls within ± (a value which is one-tenth of a main wavelength of light which transmits the blue color filter) of a value obtained by adding, to the total retardation of the at least one optical compensation film, natural number times the main wavelength of the light which transmits the blue color filter.

According to the arrangement, it is easy to cause not only the region which green light transmits but also the respective regions which light of the remaining two colors (i.e., red and blue) of so-called three primary colors transmit to have respective maximum or minimum (an extreme) transmittances during no voltage application.

This allows a defective pixel which is a region of a liquid crystal layer to which region no voltage is applied to be much less noticeable.

The OCB liquid crystal display device of the present invention allows (i) the liquid crystal layer in the region corresponding to the red color filter, (ii) the liquid crystal layer in the region corresponding to the green color filter, and (iii) the liquid crystal layer in the region corresponding to the blue color filter to be different in thickness.

As described earlier, a retardation is the product of a dielectric anisotropy of liquid crystal molecules and a thickness of a liquid crystal layer.

According to the arrangement, it is possible to easily realize a desired retardation by differentiating the thicknesses of the respective liquid crystal layers.

The OCB liquid crystal display device of the present invention is arranged such that: said at least one of the first and second substrates includes a color filter which includes a red color filter, a green color filter, and a blue color filter, a thickness of the liquid crystal layer in a region corresponding to the green color filter is set so that a retardation of the liquid crystal layer in the region corresponding to the green color filter which retardation is obtained while no voltage is applied falls within ± (a value which is one-tenth of a main wavelength of light which transmits the green color filter) of a value obtained by adding, to the total retardation of the at least one optical compensation film, natural number times the main wavelength of the light which transmits the green color filter, a thickness of the liquid crystal layer in a region corresponding to the red color filter falls within ± (a value which is one-tenth of a main wavelength of light which transmits the red color filter) of a value obtained by adding, to the thickness of the liquid crystal layer in the region corresponding to the green color filter, a value which is twice as large as a difference between (i) a thickness causing the liquid crystal layer in the region corresponding to the red color filter to have an extreme transmittance while an ON voltage is being applied to the liquid crystal layer in the region corresponding to the red color filter during display and (ii) the thickness of the liquid crystal layer in the region corresponding to the green color filter, and a thickness of the liquid crystal layer in a region corresponding to the blue color filter falls within ± (a value which is one-tenth of a main wavelength of light which transmits the blue color filter) of a value obtained by subtracting, from the thickness of the liquid crystal layer in the region corresponding to the green color filter, a value which is twice as large as a difference between (i) a thickness causing the liquid crystal layer in the region corresponding to the blue color filter to have an extreme transmittance while an ON voltage is being applied to the liquid crystal layer in the region corresponding to the blue color filter during display and (ii) the thickness of the liquid crystal layer in the region corresponding to the green color filter.

According to the arrangement, the thickness of the liquid crystal layer is set so that the liquid crystal layer has the extreme transmittance with respect to the green light (described earlier) during no voltage application, whereas the liquid crystal layer has respective lower transmittances with respect to the red light and the blue light during an application of an On-voltage of a voltage for an actual display (e.g., during a black voltage application in the normally white liquid crystal display device).

Specifically, the respective thicknesses of the liquid crystal layers in the regions corresponding to the red color filter and the blue color filter, respectively are set so that a defect made during no voltage application is less noticeable while the liquid crystal layers substantially retain a low transmittance obtained during an On-voltage application in a case of a multi-gap structure (in which a thickness of a liquid crystal layer is uniform in all regions corresponding to a red color filter, a green color filter, and a blue color filter, respectively).

Accordingly, even if the liquid crystal layers corresponding to the red color filter, the green color filter, and, the blue color filter, respectively are driven at an identical voltage, it is possible to prevent a decrease in contrast and to cause a defective pixel to be less noticeable.

The OCB liquid crystal display device of the present invention is arranged such that the respective polarizing plates are provided so that their optical axes cross at right angles.

According to the arrangement, it is possible to cause a defective pixel to be less noticeable in the normally white liquid crystal display device in which the defective pixel is likely to be noticeable during display. This is because a bright dot defect occurs in a dark screen in the liquid crystal layer to which no voltage is applied.

The OCB liquid crystal display device of the present invention is arranged such that (i) the liquid crystal layer in the region corresponding to the red color filter, (ii) the liquid crystal layer in the region corresponding to the green color filter, and (iii) the liquid crystal layer in the region corresponding to the blue color filter constitute one (1) display unit.

According to the arrangement, it is possible to easily realize a full-color display since one (1) display unit is constituted by so-called three primary colors.

The OCB liquid crystal display device of the present invention is arranged such that the main wavelength falls within 542 nm±10%.

According to the arrangement, it is possible to cause a display defect to be less noticeable since the main wavelength falls within a wavelength in which human eyes are likely to feel light intense.

The OCB liquid crystal display device of the present invention is arranged such that the main wavelength of the light which transmits the green color filter falls within 542 nm±10%.

The OCB liquid crystal display device of the present invention is arranged such that the main wavelength of the light which transmits the red color filter falls within 609 nm±10%.

The OCB liquid crystal display device of the present invention is arranged such that the main wavelength of the light which transmits the blue color filter falls within 506 nm±10%.

As described earlier, the liquid crystal display device of the present invention is arranged such that the retardation of the liquid crystal layer falls within ± (the value which is one-tenth of the main wavelength) of the value obtained by adding natural number times the main wavelength to the total retardation of the at least one optical compensation film.

This brings about an effect that it is possible to obtain a liquid crystal display device having an OCB liquid crystal display panel in which liquid crystal display device a defective pixel is less noticeable during display.

BRIEF DESCRIPTION OF DRAWINGS

FIG. 1, which illustrates an embodiment of the present invention, is a block diagram schematically illustrating a liquid crystal display device.

FIG. 2

FIG. 2, which illustrates the embodiment of the present invention, is a graph illustrating wavelength dependences of respective transmittances of respective color filters.

FIG. 3

FIG. 3 is a graph illustrating a relationship between (i) a cell thickness and (ii) a transmittance in an entire visible light range, which relationship is obtained while no voltage is applied.

FIG. 4

FIG. 4 is a graph illustrating a relationship between (i) a cell thickness and (ii) respective transmittances with respect to red light, green light, and blue light, which relationship is obtained while no voltage is applied.

FIG. 5

FIG. 5 is a graph illustrating a relationship between (i) a transmittance with respect to green light which transmittance is obtained during no voltage application and (ii) a transmittance with respect to blue light which transmittance is obtained during voltage application.

FIG. 6, which illustrates the embodiment of the present invention, is a graph illustrating a relationship between a voltage and a transmittance, which relationship is obtained in a case where a cell thickness is 3.9 μm.

FIG. 7, which illustrates the embodiment of the present invention, is a graph illustrating a relationship between a voltage and a transmittance, which relationship is obtained in a case where a cell thickness is 7.2 μm.

FIG. 8

FIG. 8 is a graph illustrating a relationship between a cell thickness and a transmittance, with respect to each of light emitted from a green pixel and monochromatic light whose wavelength is 542 nm.

FIG. 9, which illustrates another embodiment of the present invention, is a cross-sectional view schematically illustrating a liquid crystal display device.

FIG. 10 is a graph illustrating a relationship between an applied voltage and respective transmittances of pixels having respective colors in a multi-gap structure.

FIG. 11, which illustrates a further embodiment of the present invention, is a graph illustrating a relationship between an applied voltage and respective transmittances of pixels having respective colors in the multi-gap structure.

FIG. 12

FIG. 12 is a graph illustrating cell thickness dependences of respective transmittances of a green pixel which transmittances are obtained (i) during no voltage application and (ii) during black voltage application.

FIG. 13

FIG. 13 is a graph illustrating cell thickness dependences of respective transmittances of a red pixel which transmittances are obtained (i) during no voltage application and (ii) during black voltage application.

FIG. 14

FIG. 14 is a graph illustrating cell thickness dependences of respective transmittances of a blue pixel which transmittances are obtained (i) during no voltage application and (ii) during black voltage application.

FIG. 15, which illustrates a further embodiment of the present invention, is a graph illustrating a relationship between an applied voltage and respective transmittances of pixels having respective colors in the multi-gap structure.

FIG. 16 is a cross-sectional view schematically illustrating an arrangement of an OCB liquid crystal display device.

FIG. 17 is the cross-sectional view schematically illustrating the arrangement of the OCB liquid crystal display device.

FIG. 18 is a graph illustrating a relationship between an applied voltage and respective transmittances of (i) a normally white OCB liquid crystal display device and (ii) a normally black OCB liquid crystal display device.

FIG. 19

FIG. 19 is a graph illustrating a relationship between a cell thickness and a transmittance obtained during a black display, which relationship is obtained in the OCB liquid crystal display device.

REFERENCE SIGNS LIST

Figure 1:
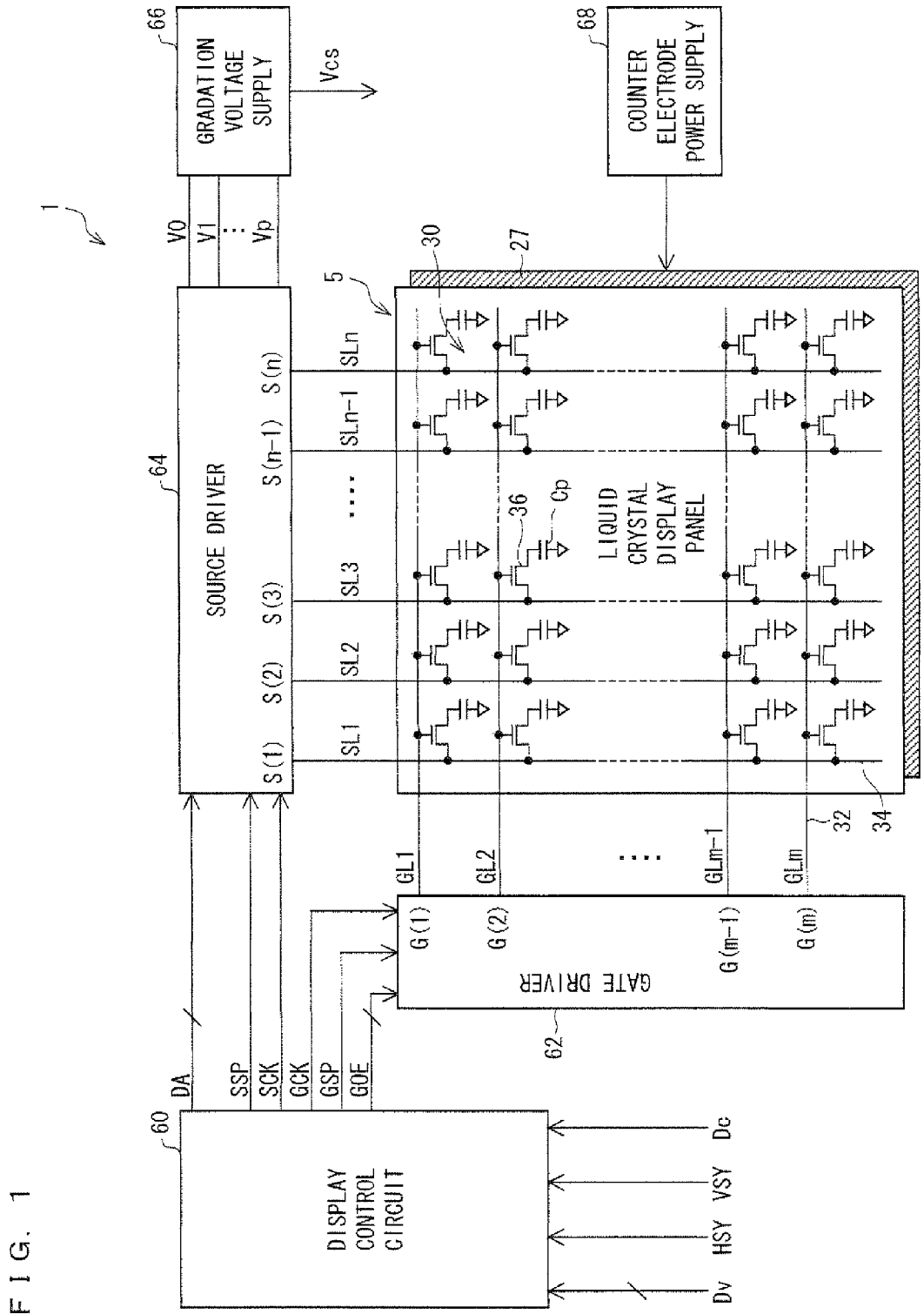
FIG. 1

1 Liquid crystal display device
5 Liquid crystal display panel
10 First substrate
11 First glass substrate
13 Wiring layer
15 Insulating layer
17 Pixel electrode
19 First alignment film
20 Second substrate
21 Second glass substrate
23 Color filter
23R Red color filter
23G Green color filter
23B Blue color filter
27 Counter electrode
29 Second alignment film
30 Pixel
30R Red pixel
30G Green pixel
30B Blue pixel
32 Gate bus line
34 Source bus line
36 TFT element
41 First optical compensation film (Optical compensation film)
43 First polarizing plate (Polarizing plate)

45 Second optical compensation film (Optical compensation film)
47 Second polarizing plate (Polarizing plate)
50 Liquid crystal layer
52 Liquid crystal molecule
60 Display control circuit
62 Gate driver
64 Source driver
66 Gradation voltage supply
68 Counter electrode power supply
70 Backlight
Re(l) Retardation of liquid crystal layer
Re(f) Retardation of optical compensation film
Re(r) Residual retardation
λd Main wavelength

DESCRIPTION OF EMBODIMENTS

[First Embodiment]
An embodiment of the present invention is described below with reference to FIGS. 1 through 10.
(Arrangement of Liquid Crystal Display Device)
First, the following describes an arrangement of a liquid crystal display device of the present embodiment with reference to FIG. 1. FIG. 1 is a block diagram schematically illustrating a liquid crystal display device 1.

The liquid crystal display device 1 includes: (i) a gate driver 62 serving as a scanning signal line drive circuit, (ii) a source driver 64 serving as a data signal line drive circuit, (iii) a display control circuit 60 for controlling the gate driver 62 and the source driver 64, (iv) a gradation voltage supply 66, (v) a counter electrode power supply 68 for driving a counter electrode 27, and (vi) an active matrix liquid crystal display panel 5.

Furthermore, the liquid crystal display panel 5 of the liquid crystal display device 1 includes: (i) a plurality of gate bus lines 32 (GL1 through GLm) each of which serves as a scanning signal line, (ii) a plurality of source bus lines 34 (SL1 through SLn) which cross the plurality of gate bus lines 32 (GL1 through GLm) and each of which serves as a data signal line, and (iii) a plurality of (m×n) pixels 30 which are provided at respective intersections of the plurality of gate bus lines 32 (GL1 through GLm) and the plurality of source bus lines 34 (SL1 through SLn). The liquid crystal display panel 5 further includes, in an identical layer in which the plurality of gate bus lines 32 are provided, a common electrode (not illustrated) is provided so as to be parallel to the plurality of gate bus lines 32. Any electric potential can be externally and independently supplied via the common electrode.

The plurality of pixels 30, which are provided in a matrix manner, constitute a pixel array. Each of the plurality of pixels 30 includes: (i) a TFT element 36 serving as a switching element, (ii) a pixel electrode 17 which is connected to a drain terminal of the TFT element 36, and (iii) a liquid crystal layer 50.

A gate terminal of the TFT element 36 is connected to a corresponding gate bus line 32 passing through a corresponding intersection. A source terminal of the TFT element 36 is connected to a corresponding source bus line 34 passing through the corresponding intersection. A pixel capacitance Cp is constituted by capacitances such as a liquid crystal capacitance defined by the pixel electrode 17 and the counter electrode 27.

(Drive of the Liquid Crystal Display Device)
The liquid crystal display device 1 is driven as follows. Namely, the gate driver 62 and the source driver 64 cause an electric potential to be applied to a pixel electrode 17 in each of the plurality of pixels 30 in accordance with an image to be displayed. This causes a voltage to be applied to the liquid crystal layer 50 (liquid crystal molecules 52) in accordance with an electric potential difference between the pixel electrode 17 and the counter electrode 27. This voltage application controls an amount of light which transmits the liquid crystal layer 50, whereby display is carried out.

Note, in FIG. 1, that DA, SSP, SCK, GCK, GSP, GOE, Dv, HSY, VSY, Dc, and VCS refer to: a digital image signal, a source start pulse signal, a source clock signal, a gate clock signal, a gate start pulse signal, a gate driver output control signal, a digital video signal, a horizontal sync signal, a vertical sync signal, a control signal, and a capacitor electrode applied voltage, respectively.

(Arrangement of Liquid Crystal Display Panel)
The following describes an arrangement of the liquid crystal display panel 5 of the present embodiment. Note that the liquid crystal display panel 5 of the present embodiment has an arrangement similar to the liquid crystal display panel 5 described earlier with reference to FIGS. 16 and 17.

Namely, the liquid crystal display panel 5 includes: (i) a first substrate 10 including a first glass substrate 11 on which a wiring layer 13, an insulating layer 15, the pixel electrode 17, and a first alignment film 19 are provided, (ii) a second substrate 20 including a second glass substrate 21 on which a color filter 23, the counter electrode 27, and a second alignment film 29 are provided, and (iii) the liquid crystal layer 50 provided between the first substrate 10 and the second substrate 20.

Liquid crystal molecules in the liquid crystal layer 50 have a refractive index anisotropy Δn of 0.16. A cell thickness which is a gap between the first glass substrate 11 and the second glass substrate 21 is 3.9 μm or 7.2 μm, for example. Note here that the liquid crystal layer 50 has a thickness substantially identical to the cell thickness.

(Color Filter)
Moreover, specifically, the color filter 23 includes color filters of three colors of red, green, and blue. Each of the plurality of pixels 30 is any one of three kinds: a red-displaying pixel (a red pixel), a green-displaying pixel (a green pixel), or a blue-displaying pixel (a blue pixel). The pixels of three kinds correspond to the respective color filters (the red color filter, the green color filter, and the blue color filter).

Note here that respective wavelength characteristics of light emitted from the red pixel (red light), light emitted from the green pixel (green light), and light emitted from the blue pixel (blue light) depend on an optical characteristic (a wavelength dependence of a transmittance) of the color filter 23. FIG. 2 illustrates an example of the wavelength dependence of the transmittance of the color filter 23 of the present embodiment. Note that no light which transmits the red color filter, the green color filter, and the blue color filter is monochromatic, and each of the red color filter, the green color filter, and the blue color filter causes transmission of light whose wavelength falls within a given range (see FIG. 2).

(Arrangement of Other Parts of the Liquid Crystal Display Panel)
Each of the first alignment film 19 and the second alignment film 29 is a horizontal alignment film.

A first optical compensation film 41 and a first polarizing plate 43 are attached in this order to a surface of the first glass substrate 11 which surface is opposite to the surface which faces the liquid crystal layer 50. On the other hand, a second optical compensation film 45 and a second polarizing plate 47 are attached in this order to a surface of the second glass substrate 21 which surface is opposite to the surface which faces the liquid crystal layer 50. It is preferable that the first optical compensation film 41 and the second optical compensation film 45 be provided so that their respective slow axes are perpendicular to a direction in which liquid crystal molecules orient.

According to the present embodiment, the two polarizing plates of the first polarizing plate 43 and the second polarizing plate 47 are provided so that their optical axes cross at right angles, and so-called a normally white (NW) display is carried out.

(Spray-Bend Transition)

The liquid crystal display panel 5 of the present embodiment is an OCB liquid crystal display panel. As described earlier, the liquid crystal molecules 52 have a spray orientation (see FIG. 16) while the liquid crystal display device 1 is being turned off. Accordingly, it is necessary to cause a transition of the liquid crystal molecules 52 from the spray orientation to a bend orientation (a spray-bend transition) when the liquid crystal display device 1 is turned on. The spray-bend transition generally occurs by applying a transition voltage different from a normal drive voltage (e.g., a high voltage such as 25V) to the liquid crystal layer 50.

(Retardation in OCB Liquid Crystal Display Device)

The following describes (i) a retardation of the liquid crystal layer 50 in the liquid crystal display device 1 of the present embodiment and (ii) each of the first optical compensation film 41 and the second compensation film 45.

As described earlier, according to the OCB liquid crystal display device 1: the liquid crystal molecules 52 have the spray orientation (see FIG. 16) during no voltage application, whereas the liquid crystal molecules 52 have the bend orientation (see FIG. 17) while the liquid crystal display device 1 is being driven (while normal display is being carried out).

Figure 16:
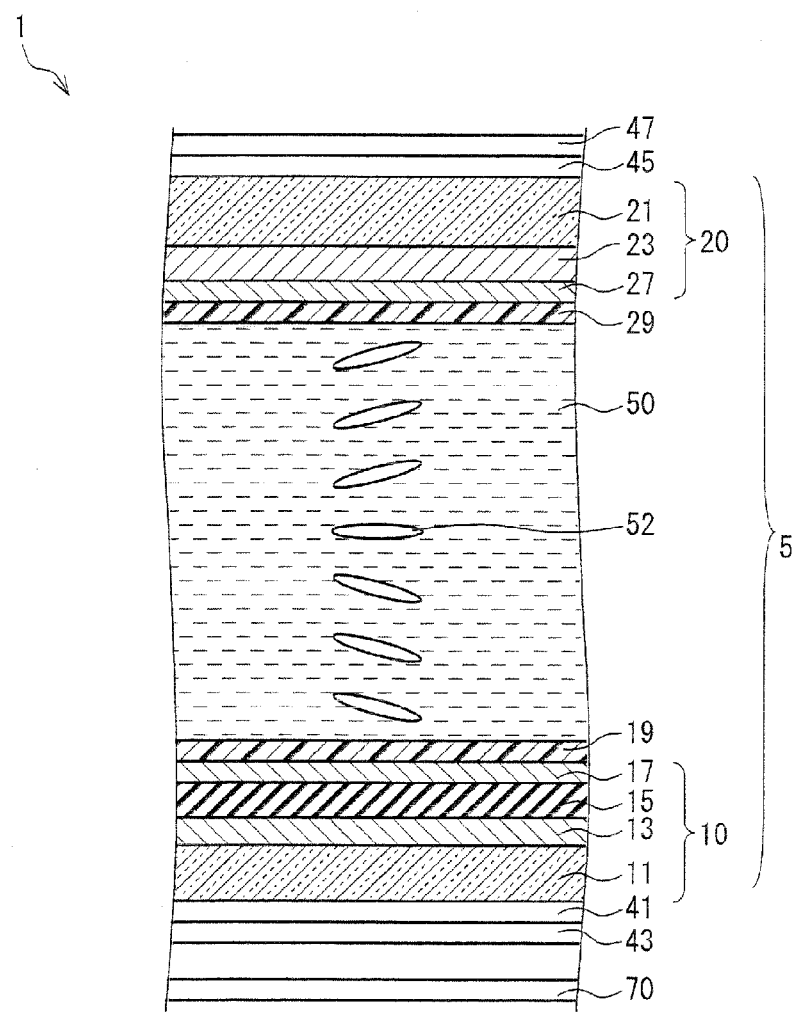
FIG. 16
Figure 17:
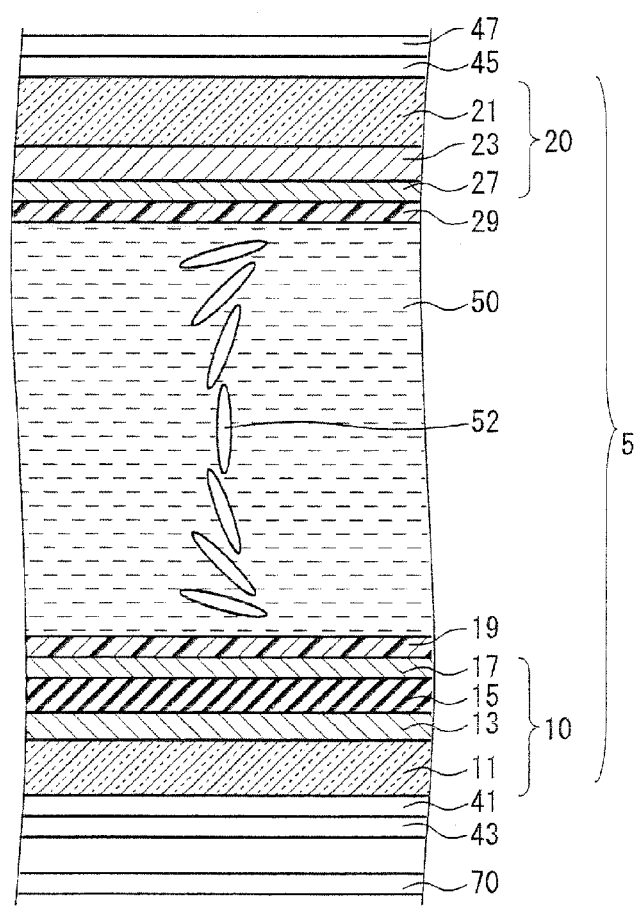
FIG. 17
Figure 18:
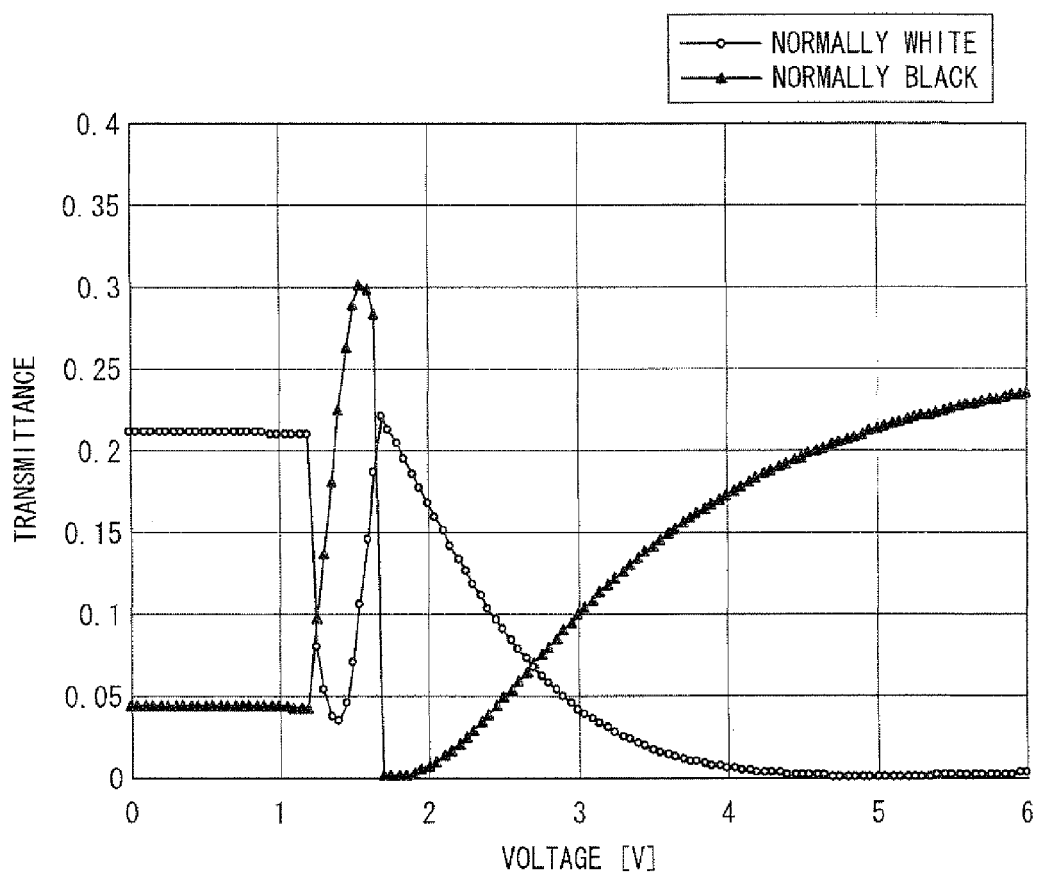
FIG. 18

In the spray orientation, a director of the liquid crystal molecules 52 (a major axis direction of the liquid crystal molecules 52) is substantially parallel to surfaces of the substrates (the first substrate 10 and the second substrate 20) in a region in the vicinity of a center of the liquid crystal layer 50 in a cell thickness direction, that is, in a central region of the liquid crystal display panel 5 in a cross-sectional direction (see FIG. 16). On the other hand, in the bend orientation, the director of the liquid crystal molecules 52 is substantially perpendicular to the surfaces of the substrates (see FIG. 17).

According to the liquid crystal display device 1, an angle of the liquid crystal molecules 52 with respect to the surfaces of the substrates which is caused by no voltage application is greatly different from that caused by a display voltage (a voltage applied while normal display is being carried out) application. As a result, a retardation of the liquid crystal layer 50 which retardation is caused during no voltage application is greatly different from that caused during the display voltage application.

This allows a design in which: a transmittance is suppressed during no voltage application, whereas a desired optical characteristic is obtained during display voltage application.

Namely, according to the liquid crystal display device 1 of the present embodiment, retardations of each of (i) a liquid crystal layer and (ii) an optical compensation film are designed so that, while maintaining an OCB display, a transmittance is suppressed to minimum during no voltage application, that is, during the spray orientation. The following describes this point.

(Transmittance (Total Wavelength) in Spray Orientation)

The following first describes, with reference to FIG. 3, a cell thickness dependence of a transmittance in a state where no voltage is applied to the liquid crystal layer 50, that is, in a state where the liquid crystal molecules 52 have the spray orientation, in the OCB liquid crystal display device 1.

FIG. 3 is a drawing illustrating a relationship between a cell thickness and a transmittance in a state where no voltage is applied to the liquid crystal layer 50, that is, in a spray orientation state, in the OCB liquid crystal display device 1. Note here that a retardation is defined by the product of a cell thickness and a refractive index anisotropy of liquid crystal molecules. Therefore, a change in retardation occurs in response to the change in cell thickness. Hence, FIG. 3 may illustrate a relationship in the liquid crystal layer 50 between the retardation and the transmittance.

Note that the transmittance illustrated in FIG. 3 is a total transmittance of light emitted from the red-displaying pixel, the green-displaying pixel, and the blue-displaying pixel. It follows that FIG. 3 illustrates the transmittance of light whose wavelength falls within an almost all visible light range. Note that the transmittance is a value obtained after a main sensitivity has been corrected. Note also that the optical compensation films (the first optical compensation film 41 and the second compensation film 45) are used in the liquid crystal display device 1 whose transmittance is illustrated in FIG. 3.

A change in transmittance occurs in response to a change in cell thickness (see FIG. 3). Namely, a change in transmittance occurs in response to a change in retardation, and the transmittance has a minimal value at a constant cell thickness.

Accordingly, in a case where the liquid crystal display panel 5 is designed so as to have a cell thickness which causes a minimal transmittance in the spray orientation, it is possible for a pixel 30 (a defective pixel such as a TFT element defective pixel or a short-circuited pixel) to be less noticeable, even if there exists such a pixel 30 which can apply no voltage to the liquid crystal layer 50 because a TFT element of the pixel 30 is defective or upper and lower substrates are short-circuited. This is because it is possible to reduce a transmittance in the spray orientation.

(Transmittance in Spray Orientation (Each Color))

According to the liquid crystal display device 1, a color is realized on condition that a single picture element is generally constituted by three pixels 30 of (i) a pixel 30 including a red color filter 23R (a red pixel 30R), (ii) a pixel 30 including a green color filter 23G (a green pixel 30G), and (iii) a pixel 30 including a blue color filter 23B (a blue pixel 30B. Accordingly, in a case of a defect of a TFT element 36 or a defect due to a short-circuit of the upper and lower substrates, it is often the case that a single one of red, green, and blue pixels sometimes appears to be turned on.

Therefore, setting of the cell thickness in view of a human color visibility allows the defective pixel to be less noticeable.

Namely, human eyes, which feel an intensity of light depending on a color of the light, and feel green light the most intense. Accordingly, it is possible for a pixel defect to be much less visible, in a case of causing a reduction in transmittance of a green pixel, from which green light is emitted, during no voltage application.

Consequently, a relationship between a transmittance and a cell thickness was measured with respect to each of the red light, the green light, the blue light, that is, the red pixel 30R, the green pixel 30G, and the blue pixel 30B each serving as the pixel 30 from which light of the respective colors is emitted. FIG. 4 illustrates measured results.

FIG. 4 is a graph illustrating a state in which no voltage is applied to the liquid crystal layer 50 in the OCB liquid crystal display device 1. Namely, FIG. 4 is the graph illustrating, in a state where the liquid crystal molecules 52 have the spray orientation, cell thickness dependences of respective transmittances of the red-displaying pixel, the green-displaying pixel, and the blue-displaying pixel. Note that each of the transmittances is a value obtained after the main sensitivity has been corrected.

(Setting of Cell Thickness on the Basis of Green)

A cell thickness which causes a minimum transmittance varies depending on a color, that is, a wavelength (see FIG. 4). Specifically, for example, in a case of the green light which human eyes feel the most intense, the transmittance has minimal values in the vicinity of a cell thickness of 0.6 µm, 3.9 µm, 7.2 µm, and the like.

Therefore, in order for a pixel defect to be less visible, it is the most effective way to set a cell thickness to any of the aforementioned values so that the green pixel 30G from which the green light is emitted has a low transmittance during no voltage application.

Namely, in a case where the liquid crystal display panel 5 is designed so as to have a cell thickness which causes a minimal transmittance in the spray orientation, it is possible for a pixel 30 (a defective pixel such as a TFT element defective pixel or a short-circuited pixel) to be less noticeable, even if there exists such a pixel 30 which can apply no voltage to the liquid crystal layer 50 because a TFT element of the pixel 30 is defective or upper and lower substrates are short-circuited.

This causes a reduction in transmittance of the pixel 30 which has conventionally been recognized as a bright dot in the normally white liquid crystal display device since no voltage can be applied to the pixel 30. Namely, this causes a reduction in luminance of the bright dot, thereby causing a defective pixel to be less recognizable.

(Arrangement of the Liquid Crystal Display Device with Optical Compensation Film)

Note here that an optical compensation film, for example, for increasing a viewing angle or compensating for a residual retardation is generally used in the liquid crystal display device 1 having the OCP liquid crystal display panel, as described earlier.

For this reason, even if the liquid crystal display panel 5 is designed, in an arrangement in which a polarizing plate, a liquid crystal layer, and a polarizing plate (described earlier) are provided, so that a transmittance of a defective pixel is low, the transmittance of the defective pixel may not decrease in an actual arrangement (i.e., an arrangement in which an optical compensation film is used) in which a polarizing plate, the optical compensation film, a liquid crystal layer, the optical compensation film, and a polarizing plate are provided.

This is because a retardation of the optical compensation film is added to light which transmits a defective pixel, thereby causing a change in polarization state. Note that the change in polarization state may make it impossible to expect a similar decrease in transmittance to a decrease in transmittance which decrease is obtained in the case of the arrangement in which the polarizing plate, the liquid crystal layer, and the polarizing plate are provided.

(Cell Thickness and Optical Compensation Film)

In view of the circumstances, it is necessary to provide an arrangement in which a transmittance of a defective pixel remains low even if an optical compensation film is used so as to increase a viewing angle or so as to compensate for a residual retardation.

Namely, it is necessary, in an arrangement in which an optical compensation film is used, to obtain both a low transmittance in the spray orientation and a contrast during an actual display in the bend orientation.

Therefore, in view of retardations of the liquid crystal layer 50 and the optical compensation film (the optical compensation film 41 and/or the optical compensation film 45), the liquid crystal display device 1 of the present embodiment is arranged such that a retardation Re(l) of the liquid crystal layer 50 is set so as to be natural number times as large as a retardation Re(f) of the optical compensation film 41 and/or the optical compensation film 45. Note here that in a case where a single optical compensation film is used, the retardation Re(f) refers to a retardation of the single optical compensation film, whereas in a case where a plurality of optical compensation films are used, the retardation Re(f) refers to a total retardation of the plurality of optical compensation films.

In a case where (i) the optical compensation film 41 and/or the optical compensation film 45 and (ii) the liquid crystal layer 50 have such a relationship in view of a retardation, a polarization state of light which transmits only the liquid crystal layer 50 corresponding to a defective pixel is unchanged even if the light transmits the optical compensation film 41 and/or the optical compensation film 45.

As a result, in a case where a retardation, specifically, a thickness of the liquid crystal layer 50 is set to any of the thicknesses which cause respective minimal transmittances illustrated in FIG. 3 or 4, it is possible to decrease the transmittance of the defective pixel even if the optical compensation film 41 and/or the optical compensation film 45 are/is used in the liquid crystal display device 1.

(Optimization with Respect to Green)

The following describes an embodiment in which a cell thickness is optimized with respect to the green light.

FIG. 5 illustrates a cell thickness dependence of a transmittance obtained during no voltage application to the green pixel 30G. A dotted line in FIG. 5 illustrates a transmittance obtained while the blue pixel 30B is being turned on (during an Off-state voltage application in an actual display).

In a case of light emitted from the green pixel 30G, the transmittance has minimal values during no voltage application at cell thicknesses of 0.6 µm, 3.9 µm, 7.2 µm, and 11.0 µm. Namely, there exists a thickness in which the transmittance has a minimal value (see FIG. 5).

(Designing of the Liquid Crystal Display Panel)

Note here that a display defect is hardly noticeable when a luminance of the display defect has a similar luminance to a luminance obtained while a blue pixel is being turned on. Therefore, the green pixel is designed so as to have a transmittance, obtained during no voltage application, which is not more than a transmittance obtained while the blue pixel is being turned on.

Namely, in the embodiment illustrated in FIG. 5, the cell thickness of 10.5 µm is unsuitable among the cell thicknesses of 0.6 µm, 3.9 µm, 7.2 µm, and 10.5 µm which cause the green pixel to have minimal transmittances. This is because the green pixel has a luminance, obtained during no voltage application, which exceeds the transmittance obtained while the blue pixel is being turned on (during an actual display), in the case of the cell thickness of 10.5 µm.

Note that the cell thickness of 0.6 µm is also unsuitable since it causes little light to transmit the green pixel during an actual display (during the bend orientation).

Therefore, the cell thicknesses of 3.9 µm and 7.2 µm are more suitable for solving the problems.

Figure 6:
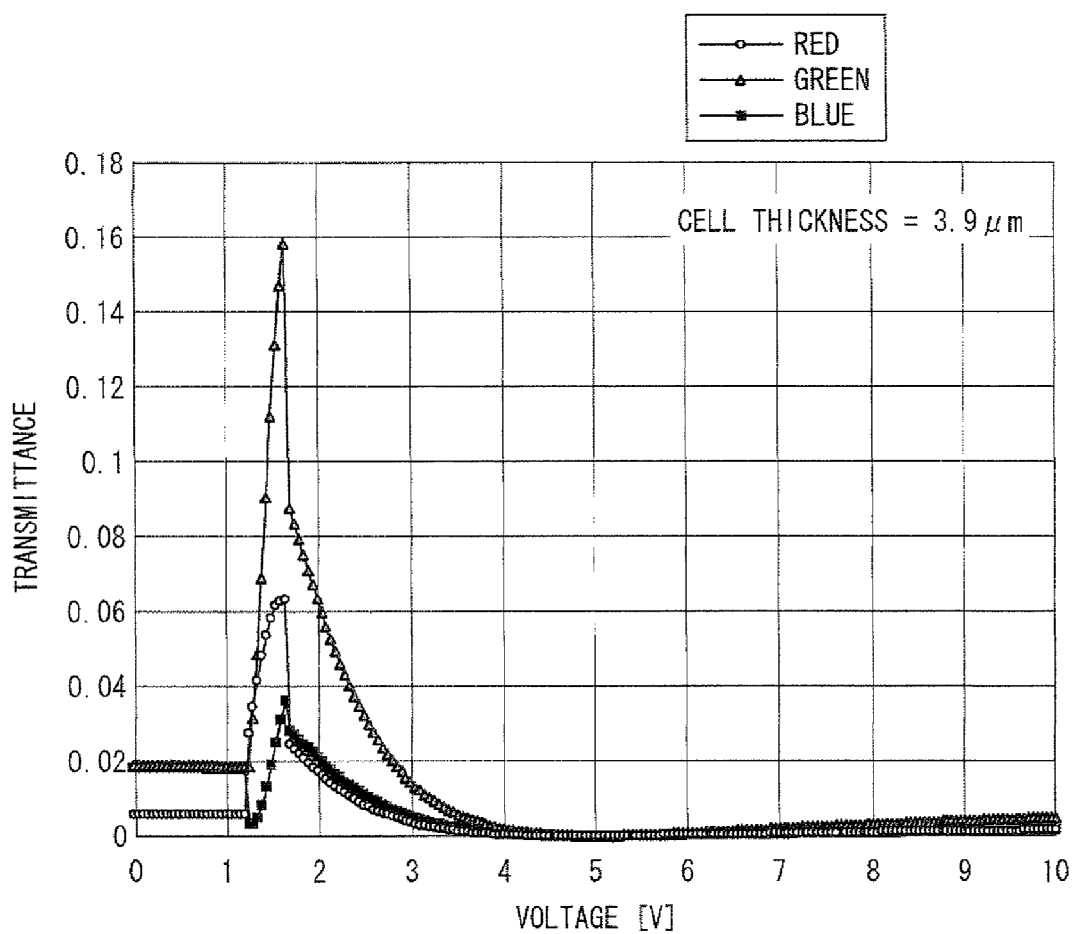
FIG. 6
Figure 7:
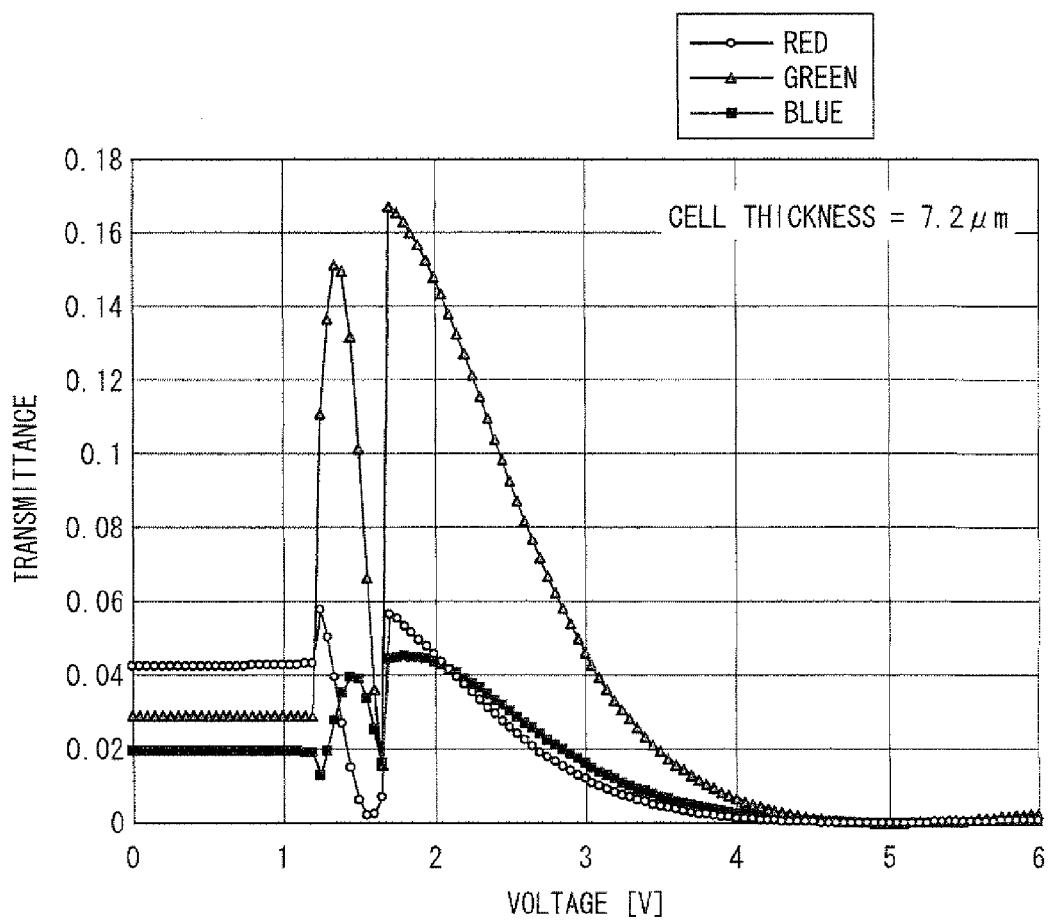
FIG. 7

The following describes (i) a case where the cell thickness is set to 3.9 µm and (ii) a case where the cell thickness is set to 7.2 µm with reference to FIGS. 6 and 7, respectively. FIG. 6 is a graph illustrating a relationship between the cell thickness and a transmittance, which relationship is obtained in the case where the cell thickness is set to 3.9 µm, and FIG. 7 is a graph illustrating a relationship between the cell thickness and a transmittance, which relationship is obtained in the case where the cell thickness is set to 7.2 μm. In FIGS. 6 and 7, red (R), green (G), and blue (B) refer to transmittances with respect to red light, green light, and blue light, respectively.

(Arrangement of Cell Thickness of 3.9 μm)

Note here that in the case where the cell thickness is set to 3.9 μm, the liquid crystal layer had a retardation Re(l) of 624 nm (a refractive index anisotropy Δn of liquid crystal molecules is 0.16) during no voltage application, and the optical compensation film had a retardation Re(f) of 54.7 nm (the total retardation of the first optical compensation film 41 and the second optical compensation film 45).

In this case, (1) the retardation Re(l) of the liquid crystal layer which retardation is obtained during no voltage application and (ii) the retardation Re(f) of the optical compensation film satisfy a relationship expressed by the following equation.

$$Re(l)=Re(f)+\lambda(d)\times n \quad \text{Equation (1)}$$

Note here that λ(d) and n indicate a main wavelength and a natural number, respectively.

Specifically, in the embodiment in which the cell thickness is set to 3.9 μm, the main wavelength is set to 542 nm so as to correspond to the light which transmits the green pixel, and n is set to 1.

(Arrangement of Cell Thickness of 7.2 μm)

Note here that in the case where the cell thickness is set to 7.2 μm, the liquid crystal layer had a retardation Re(l) of 1152 nm (the reflective index anisotropy Δn of the liquid crystal molecule is 0.16), during no voltage application and the optical compensation film had a retardation Re(f) of 100.9 nm (the total retardation of the first optical compensation film 41 and the second, optical compensation film 45).

In this case, the main wavelength is set to 542 nm, and n is set to 2.

In each of (i) the case where the cell thickness is set to 3.9 μm and (ii) the case where the cell thickness is set to 7.2 μm, the transmittances obtained during no voltage application with respect to light of the respective colors of red, blue, and green are less than a transmittance of blue light which transmittance is obtained during an actual display (during a voltage application) in the bend orientation. This allows a display defect due to a TFT element defect or an upper and lower short-circuit to be less noticeable.

In the case where the cell thickness is set to 3.9 μm, the transmittances with respect to light of the respective colors of red, green and blue are not more than 0.02 during no voltage application (see FIG. 6).

On the other hand, in the case where the cell thickness is set to 7.2 μm, the transmittances of light of the respective colors of red, green and blue are not more than approximately 0.05 during no voltage application (see FIG. 7). Therefore, a decrease in transmittance is smaller in this case than in the case where the cell thickness is set to 3.9 μm. However, it is possible in this case to prevent a decrease in transmittance which decrease is obtained in the vicinity of 1.8 V (a voltage applied in the vicinity of a boundary of the bend orientation) in the case where the cell thickness is set to 3.9 μm.

As described earlier, it is possible to realize a liquid crystal display device 1 which is capable of satisfying both characteristics of (i) an actual display in the bend orientation and (ii) suppression of a transmittance in a defective pixel by setting a cell thickness to a value which causes a minimal transmittance during no voltage application and by setting the cell thickness so that the retardation Re(l) of the liquid crystal layer 50 is natural number times as large as the retardation Re(f) of the optical compensation film 41 and/or the optical compensation film 45. Furthermore, a change in cell thickness allows a selection, for example, of an arrangement for prioritizing an actual display in the bend orientation (in which arrangement the cell thickness is set to 7.2 μm) or an arrangement for prioritizing suppression of a transmittance in a defective pixel (in which arrangement the cell thickness is set to 3.9 μm).

(Calculation of Cell Thickness)

Note that it is possible to find, by an arithmetic operation, the cell thicknesses which cause respective minimal transmittances.

Note here that no light, which transmits the color filters of the respective colors, is monochromatic (light whose wavelength falls within a given wavelength range transmits a corresponding color filter) as described earlier with reference to FIG. 2. However, it is possible to consider for convenience that light having a single wavelength transmits a corresponding color filter.

The following description deals with a case in which green light is exemplified, with reference to FIG. 8. Note here that FIG. 8 is a graph illustrating a relationship between a cell thickness and a transmittance, with respect to each of light emitted from the green pixel 30G (light which transmits the green filter 230) and monochromatic light whose wavelength (main wavelength) is 542 nm.

A cell thickness which causes a minimal transmittance, with respect to the light emitted from the green pixel 300, during no voltage application coincides with a cell thickness which causes a minimal transmittance, with respect to the monochromatic light whose wavelength is 542 nm, during no voltage application (see FIG. 8).

Namely, FIG. 8 shows that minimal transmittances, that is, minimal luminances (a.u.) are obtained in a case where a cell thickness is set so that a relationship expressed by the following equation is satisfied, where (i) a main wavelength λ(m) indicates a wavelength of monochromatic light, (ii) Re(l) indicates a retardation of a liquid crystal layer which retardation is obtained during no residual voltage application, and (iii) Re(r) indicates a residual retardation and λ(d) and n are set to 542 nm and a natural number, respectively.

$$Re(l)=Re(r)+\lambda(d)\times n \quad \text{Equation (2)}$$

Therefore, it is only necessary to determine a cell thickness so that a transmittance obtained during no voltage application is not more than a constant value in cases of (i) a cell thickness which satisfies the Equation (2) and (ii) a cell thickness in the vicinity of (i).

In a case where an arithmetic operation is carried out based on a wavelength of monochromatic light, it is possible, while a given optical characteristic is obtained in the bend orientation, to design a liquid crystal display panel (determine a cell thickness) with the use of a selected retardation which causes a minimum transmittance during no voltage application.

[Second Embodiment]

Figure 9:
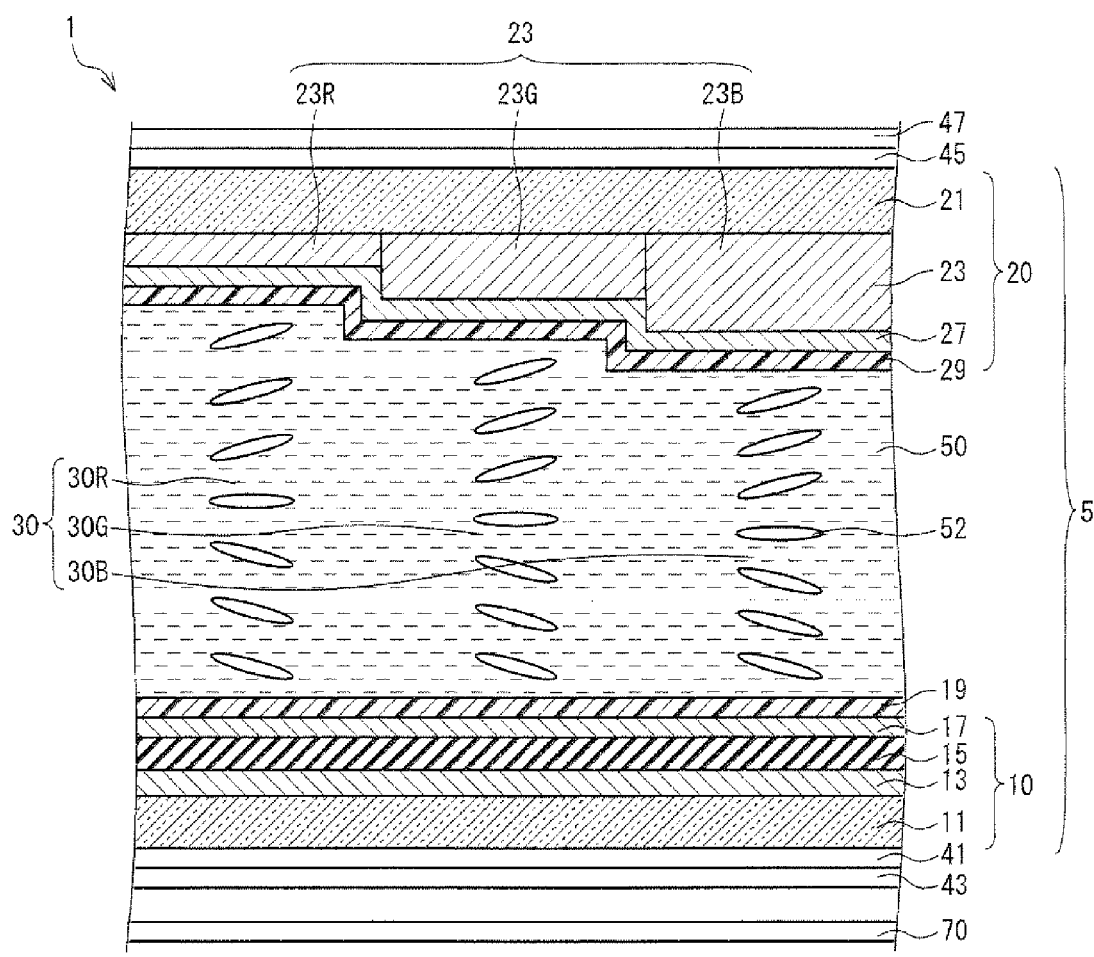
FIG. 9
Figure 10:
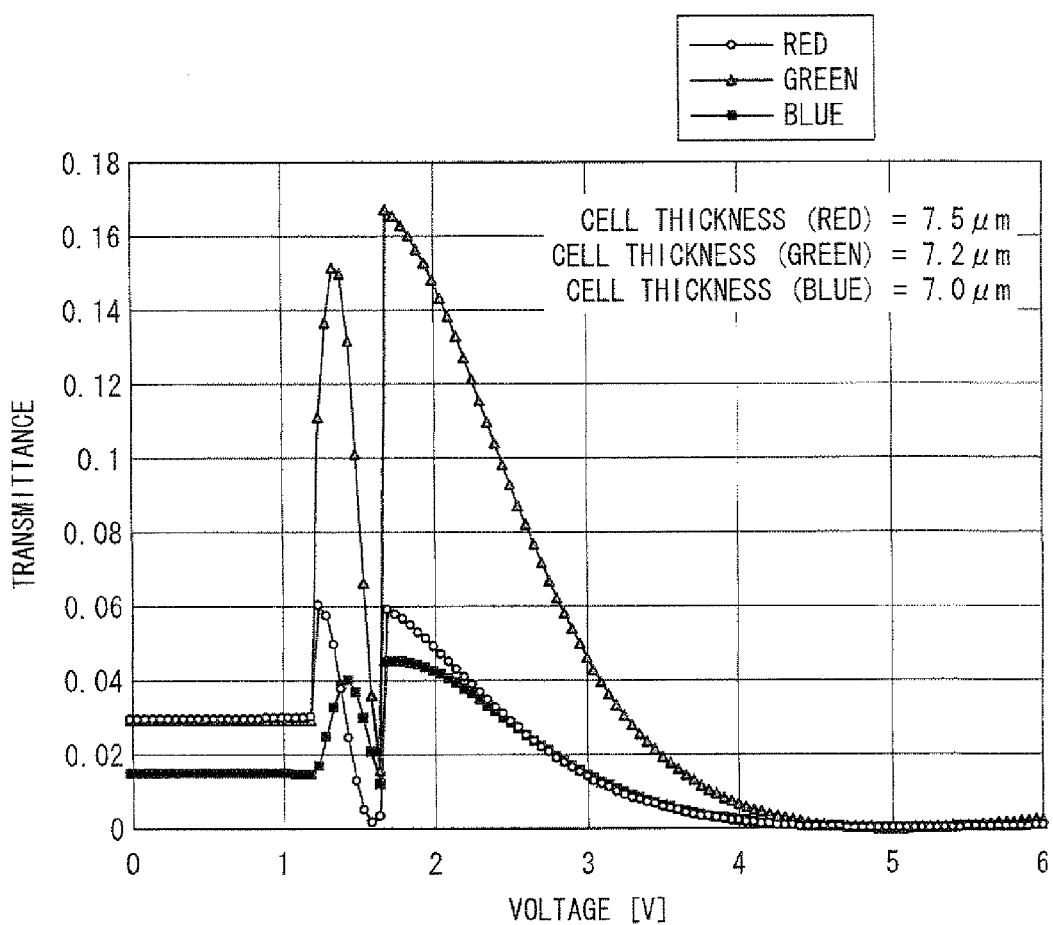
FIG. 10
Figure 11:
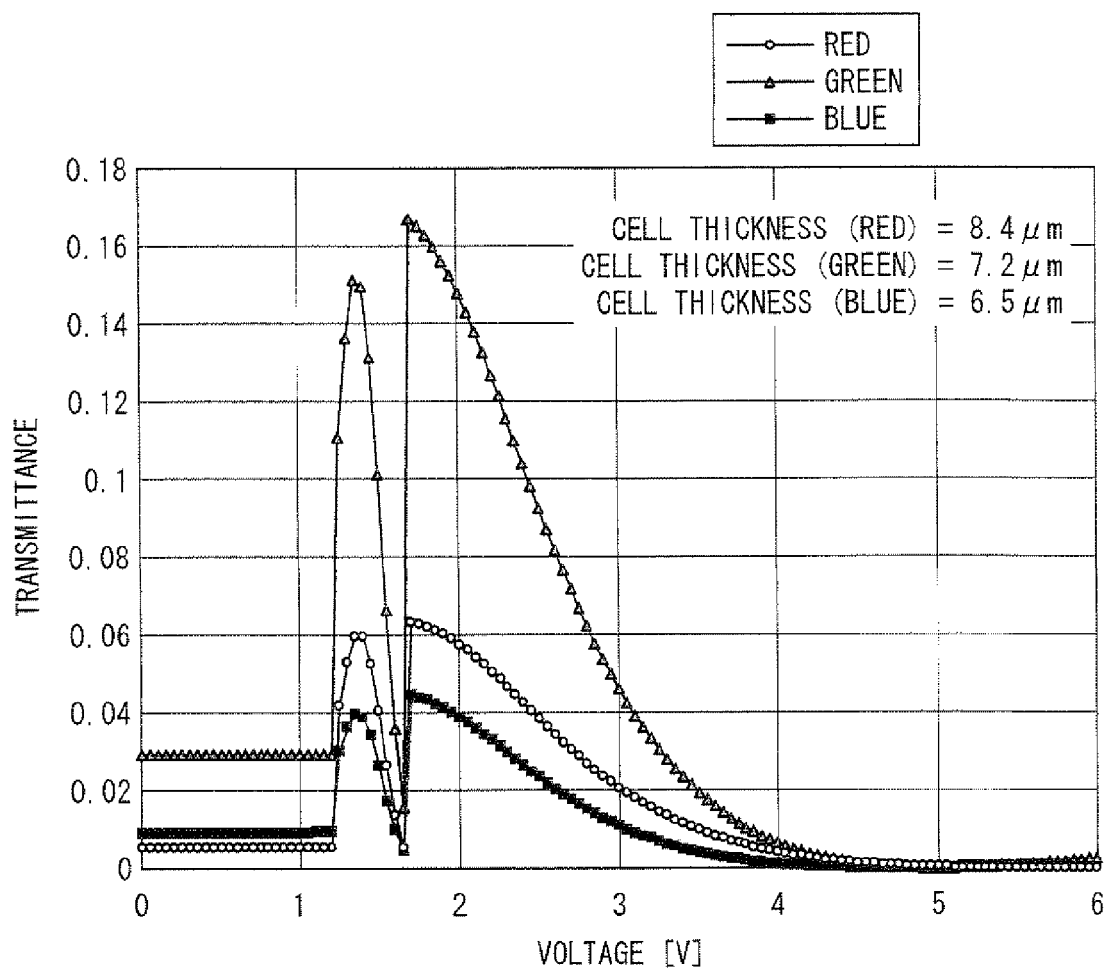
FIG. 11

The following describes another embodiment of the present invention mainly with reference to FIGS. 9 through 11. Note that an arrangement which is not described in the present embodiment is identical to the arrangement described in the First Embodiment. Note also that, for convenience, members having functions identical to those of the respective members illustrated in the drawings of the First Embodiment are given respective identical reference numerals, and a description of those members is omitted here.

In the First Embodiment, the liquid crystal display panel 5 is designed such that light emitted from a green pixel (a pixel from which green light is emitted) among defective pixels has a luminance which is similar to or not more than a luminance of light emitted from a blue pixel (a pixel from which blue light is emitted) which luminance is obtained while the blue pixel is being turned on (during an actual display). Namely, the liquid crystal display panel 5 is designed mainly in consideration of the green pixel.

On the other hand, a liquid crystal display panel 5 of the present embodiment has a feature in which the liquid crystal display panel 5 is designed in consideration of the blue pixel and a red pixel (a pixel from which red light is emitted) as well as the green pixel. The following describes this point.

Transmittances are lower with respect to the red light and the blue light than with respect to the green light on the whole during no voltage application (see FIG. 4). The present embodiment makes use of this characteristic. Specifically, since the blue pixel and the red pixel as well as the green pixel have respective low transmittances, a defective pixel can be less noticeable as a whole. More specifically, according to the present embodiment, cell thicknesses of respective green, blue, and red light are set so as to cause a decrease in transmittance of a defective pixel (a luminance of a defective pixel) with respect to the respective colors.

(Multi-Gap Structure)

According to a liquid crystal display device 1 of the present embodiment, the liquid crystal display panel 5 has a multi-gap structure so as to realize the aforementioned characteristic.

Note here that the multi-gap structure refers to a structure in which pixels of respective colors (a red pixel 30R, a green pixel 30G, and a blue pixel 30G) are different in cell thickness. The following describes this point.

FIG. 9 is a cross-sectional view schematically illustrating an arrangement of the liquid crystal display device 1 having the multi-gap structure.

According to the liquid crystal display panel 5 having the multi-gap structure, respective cell thicknesses are optimized in pixels 30 of the respective colors (the red pixel 30R, the green pixel 30G, and the blue pixel 30G). This causes the pixels 30 to be different in cell thickness in the liquid crystal display panel 5 (see FIG. 9).

Normally, in a display mode (e.g. an OCB mode) in which a birefringence of liquid crystal molecules is utilized, the multi-gap structure is used to improve a contrast, by correcting respective black luminances (luminances obtained during an ON voltage application in an actual display) of the red pixel 30R, the green pixel 30G, and the blue pixel 30B.

On the other hand, according to the multi-gap structure of the present embodiment, respective cell thicknesses of the red pixel 30R, the green pixel 30G, and the blue pixel 30B are set in consideration of characteristics of respective transmittances obtained during no voltage application. The following more specifically describes this point mainly with reference to FIG. 10.

FIG. 10 is a graph illustrating a relationship between an applied voltage and respective transmittances of the pixels having respective colors in the multi-gap structure. According to the liquid crystal display panel 5 whose optical characteristics are illustrated in FIG. 10, cell thicknesses are set in accordance with a multi-gap method (a method for setting respective cell thicknesses in the multi-gap structure) in which a characteristic of the green pixel 30G is prioritized.

Specifically, the cell thickness of the green pixel 300 is first set so that a minimum transmittance is obtained during no voltage application. Next, the respective cell thicknesses of the red pixel 30R and the blue pixel 30B are set so that the red pixel 30R and the blue pixel 30B have their respective minimum transmittances while a black voltage (an ON voltage applied during an actual display) is being applied.

As a result, the red pixel and the blue pixel are large and small, respectively, in cell thickness. Specifically, the red pixel 30R, the green pixel 300, and the blue pixel 30B have cell thicknesses of 7.5 μm, 7.2 μm, and 7.0 μm, respectively.

(Single-Gap Structure and Conventional Multi-Gap Structure)

The following describes an optical characteristic, especially a transmittance obtained during no voltage application, of the liquid crystal display device 1 having such cell thicknesses, in comparison with the optical characteristic of the liquid crystal display device 1 illustrated in FIG. 7. Note here that the liquid crystal display device 1 illustrated in FIG. 7 has a single-gap structure which is optimized with respect to the green light (a uniform cell thickness which is irrespective of the red pixel, the green pixel, or the blue pixel).

As is clear from FIG. 10, respective transmittances are lower with respect to the red light and the blue light during no voltage application in the multi-gap structure than in the single-gap structure (with the cell thickness of 7.2 μm, refer to FIG. 7) which is optimized with respect to the green light.

Namely, the transmittances of the red pixel 30R, the green pixel 30G, the blue pixel 30B in the single-gap structure are approximately 0.042, 0.028, 0.020, respectively (see FIG. 7), Whereas, in the conventional multi-gap structure, the transmittances are approximately 0.030, 0.030, and 0.017, respectively. Thus, the pixels of the three colors have respective lower transmittances in the liquid crystal display device 1 illustrated in FIG. 10 than in the single-gap structure.

However, according to the liquid crystal display device 1 (illustrated in FIG. 10) in which the respective cell thicknesses are set in accordance with the multi-gap method, there is only a slight improvement (a decrease transmittance obtained during no voltage application) in the blue pixel 30B. Namely, a decrease in transmittance in the red pixel 30R is 0.012, whereas a decrease in transmittance in the blue pixel 30B is only 0.003. This is because the transmittances obtained during no voltage application are not designed, in the multi-gap method, by taking into consideration the colors other than the green.

(Multi-Gap Structure of the Present Embodiment)

Therefore, the following describes the liquid crystal display device 1 in which the cell thicknesses are set in consideration of respective transmittances obtained during no voltage application with respect to red and blue light in addition to green light, specifically, so that the respective transmittances have respective minimal values during no voltage application.

Similarly to the multi-gap structure realized in accordance with the conventional multi-gap method, the liquid crystal display device 1 of the present embodiment is arranged such that the red pixel 30R and the blue pixel 30B are large and small, respectively, in cell thickness. This is because of prevention of a deterioration not only in transmittance obtained during no voltage application but also in display characteristic, obtained during the bend orientation, which is supposed to be used for a display.

However, the red pixel 30R and the blue pixel 30B have respective different optimized cell thicknesses. The following describes this point.

The liquid crystal display device 1 is arranged such that the pixels 30 (the red pixel 30R, the green pixel 30G, and the blue pixel 30B) have (i) the respective cell thicknesses which cause the respective minimal transmittances with respect to the respective colors during no voltage application or (ii) respective cell thicknesses in the vicinity of (i).

Specifically, the respective cell thicknesses were determined in accordance with a relationship between (i) a cell thickness obtained while no voltage is applied and (ii) respective transmittances with respect to the red, green, and blue light (see FIG. 4). Namely, the respective cell thicknesses were determined by selecting, from among a plurality of cell thicknesses which cause respective minimal transmittances with respect to the respective red, green, and blue light during no voltage application, a combination of cell thicknesses in which combination a difference in cell thickness is not large among the red, green, and blue pixels.

The following describes a case where the red pixel 30R, the green pixel 30G, and the blue pixel 30B have cell thicknesses of 8.4 µm, 7.2 µm, and 6.5 µm, respectively. Note that (i) the red, green, and blue pixels have the respective cell thicknesses which cause respective minimal transmittances and (ii) a combination is realized in which the respective cell thicknesses are close to each other.

FIG. 11 illustrates a relationship between an applied voltage and respective transmittances in the liquid crystal display device 1 in which respective cell thicknesses were determined in accordance with the aforementioned method. Namely, FIG. 11 is a graph illustrating respective transmittances of the pixels 30 (the red pixel 30R, the green pixel 30G, and the blue pixel 30B) in the liquid crystal display panel 5 in which the respective cell thicknesses of the red pixel 30R, the green pixel 30G, and the blue pixel 30B are set so that the red pixel 30R, the green pixel 30G, and the blue pixel 30B have their respective transmittances during no voltage application, that is, so that the respective transmittances with respect to red light, green light, and blue light have the respective minimum values.

Note here that the liquid crystal display device 1 is arranged such that the red pixel 30R, the green pixel 30G, and the blue pixel 30B have the cell thicknesses of 8.4 µm, 7.2 µM, and 6.5 µm, respectively (see FIG. 11).

Note also that a retardation Re(f) of an optical compensation film (a total retardation of a first optical compensation film 41 and a second optical compensation film 45) is set to 100.9 nm.

In this case, a retardation. Re(l) of the liquid crystal layer which retardation is obtained during no voltage application and the retardation Re(f) of the optical compensation film satisfy a relationship expressed by the following equation.

$$Re(l)=Re(f)+\lambda(d)\times n \qquad \text{Equation (1)}$$

Note here that λ(d) and n indicate a main wavelength and a natural number, respectively.

Specifically, n is set to 3 (i) with respect to a main wavelength of 609 nm in the red pixel 30R, (ii) with respect to a main wavelength of 542 nm in the green pixel 30G, and (iii) with respect to a main wavelength of 506 nm in the blue pixel 30B.

According to the liquid crystal display device 1 of the present embodiment, it is possible to (i) substantially retain a display characteristic which is obtained during the bend orientation and (ii) cause the respective minimal transmittances during no voltage application (see FIG. 11). Specifically, the transmittance of the red pixel 30R decreases from 0.030 to 0.006 and the transmittance of the blue pixel 30B decreases from 0.017 to 0.009, as compared with the liquid crystal display device 1 (refer to FIG. 10) which has the multi-gap structure and which is designed merely in consideration of the transmittance of the green pixel which transmittance is obtained during no voltage application.

Note that in a case where the red pixel 30R and the blue pixel 30B have such respective low transmittances, each of the red pixel 30R and the blue pixel 303 is not recognized as a defective pixel by an observer. Accordingly, only in a case where there exists a defective pixel and the defective pixel is the green pixel 300, the observer recognizes the defective pixel. This substantially allows a reduction in display defect to around one third.

Note in the present embodiment that a problem may occur that the respective transmittances slightly increase during black voltage application since the respective cell thicknesses are greatly changed. In order to address the problem, an option can be employed which causes the pixels 30 of the respective colors to be driven at respective different voltages. For example, the red pixel 30 and the blue pixel 30B can be driven at a voltage different from a voltage at which the green pixel 30G is driven.

[Third Embodiment]

The following describes a further embodiment of the present invention. Note that an arrangement which is not described in the present embodiment is identical to the arrangement described in each of the Embodiments. Note also that, for convenience, members having functions identical to those of the respective members illustrated in the drawings of each of the Embodiments are given identical reference numerals and a description of those members is omitted here.

According to the Second Embodiment, the red pixel 30R, the green pixel 300, and the blue pixel 30B are set to have the respective cell thicknesses which cause the respective minimum transmittances during no voltage application.

On the other hand, according to a liquid crystal display device 1 of the present embodiment, a green pixel 30G is set, similarly to the cell thickness of the green pixel 30G of the liquid crystal display device 1 of the Second Embodiment, to have a cell thickness which causes the green pixel 30G to have a minimum transmittance during no voltage application, whereas respective cell thicknesses of a red pixel 30R and a blue pixel 30B are set, by use of a method different from the method in which the cell thickness of the green pixel 30G is set, taking into consideration that the red pixel 30R and the blue pixel 30B should have respective more reduced transmittances while a black voltage (an ON voltage of a voltage for an actual display) is being applied. Namely, a measure is taken in which, even if the red pixel 30R, the green pixel 30G, and the blue pixel 30B are driven at an identical voltage, (i) a decrease in contrast is prevented and (ii) the respective transmittances of the red pixel 30R, the green pixel 30G, and the blue pixel 30B are decreased as much as possible during no voltage application. The following describes this point with reference to FIGS. 12 through 15.

Note here that FIGS. 12 through 14 are graphs illustrating respective cell thickness dependences of respective transmittances of the green pixel 30G, the red pixel 30R, and the blue pixel 30B, which respective transmittances are obtained, during no voltage application and during black voltage application. Note in FIGS. 12 through 14 that left and right vertical axes correspond to (i) a transmittance obtained during no voltage application and (ii) a transmittance obtained during black voltage application, respectively.

(Cell Thickness of Green Pixel)

The following describes a cell thickness of the green pixel 30G with reference to FIG. 12. A method for setting the cell thickness of the green pixel 30G is similar to the method described in the Second Embodiment.

Figure 15:
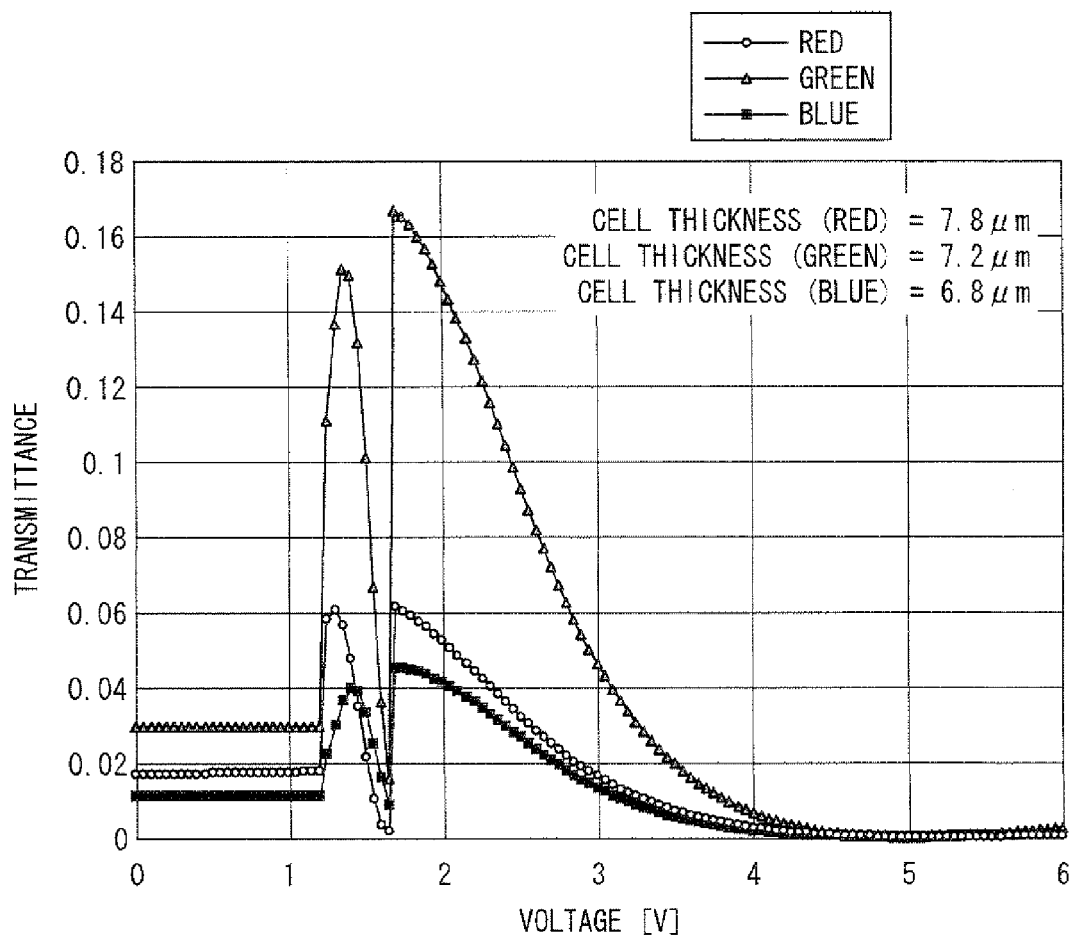
FIG. 15

Namely, according to the green pixel 30G in the liquid crystal display device 1 of the present embodiment, optical compensation films (a first optical compensation film 41 and a second optical compensation film 45) are designed so that (i) a first cell thickness which causes a minimum or minimal transmittance during no voltage application and (ii) a second cell thickness which causes a minimum or minimal transmittance during black voltage application, coincide with each other (see FIG. 15). Specifically, the cell thickness is set to 7.2 μm.

Since the first cell thickness and the second cell thickness thus coincide with each other, the cell thickness of 7.2 μm causes the minimum or minimal transmittance during black voltage application.

(Cell Thickness of Red Pixel)

The following describes a cell thickness of the red pixel 30R with reference to FIG. 13. The red pixel 30R has a minimal transmittance, during no voltage application, at a cell thickness of approximately 8.4 μm (see FIG. 13).

On the other hand, the red pixel 30R has a minimal transmittance, during black voltage application, at a cell thickness of approximately 7.5 μm. The red pixel 30R has a larger transmittance, during black voltage application, as the cell thickness is away from 7.5 μm.

This is because, in case of the red pixel 30R unlike the green pixel 30G, (i) a first cell thickness which causes a minimum or minimal transmittance during no voltage application and (ii) a second cell thickness which causes a minimum or minimal transmittance during black voltage application do not coincide with each other.

When the transmittance obtained during black voltage application increases, an excess brightness occurs in a black display. This causes a decrease in contrast.

In view of this, according to the liquid crystal display device 1 of the present embodiment, the red pixel 30R is set to have a cell thickness so that the excess brightness is reduced even if the red pixel 30R, the green pixel 30G, and the blue pixel 30B are driven at an identical voltage.

Specifically, the liquid crystal display device 1 of the present embodiment is designed such that (i) a transmittance identical to or lower than a transmittance of the red pixel 30R which transmittance is obtained during black voltage application in a single-gap structure is secured and (ii) the transmittance obtained during no voltage application is lower than a transmittance obtained during no voltage application in the single-gap structure.

As described earlier, the red pixel 30R has a minimal transmittance, during black voltage application, at a cell thickness of 7.5 μm, whereas has a transmittance, during black voltage application, which increases at a substantially identical rate as the cell thickness is away from 7.5 μm, both in a case where the cell thickness decreases and in a case where the cell thickness increases, (see FIG. 13). Namely, a graph illustrating a relationship between the cell thickness and the transmittance obtained during black voltage application has substantial line symmetry with respect to a straight line defined by the cell thickness=7.5 μm.

Accordingly, for example, in a case of obtaining the transmittance identical to or lower than the transmittance obtained during black voltage application in the single-gap structure in which the green pixel 30G has an optimized cell thickness of 7.2 μm, it is preferable that the cell thickness be within a range of 7.2 μm to a cell thickness (i.e. 7.8 μm) which is symmetrical to 7.2 μm with respect to 7.5 μm.

On the other hand, as described earlier, the red pixel 30R has the minimal transmittance, during no voltage application, at the cell thickness of 8.4 μm, and increases as the cell thickness is away from 8.4 μm.

Accordingly, the transmittance obtained during no voltage application decreases as the cell thickness increases in the range of 7.2 μm to 7.8 μm which range is preferable for the transmittance obtained during black voltage application.

Accordingly, it is appropriate that the red pixel 30R have a cell thickness of 7.8 μm which (i) is not more than 8.4 μm at which the red pixel 30R has a minimum transmittance during no voltage application and (ii) is close to 8.4 μm, from a the perspective that each of the transmittance obtained during black voltage application and the transmittance obtained during no voltage application is set to a low value.

(Cell Thickness of Blue Pixel)

The following describes a cell thickness of the blue pixel 30B with reference to FIG. 14. A method for setting the cell thickness of the blue pixel 30B is similar to the method for setting the cell thickness of the red pixel 30R. The following mainly describes a difference from the case of the red pixel 30R.

The blue pixel 30B has a minimal transmittance, during no voltage application, at a cell thickness of approximately 6.5 μm (see FIG. 14).

On the other hand, the red pixel 30R has a minimal transmittance, during black voltage application, at a cell thickness of approximately 7.0 μm. The red pixel 30R has a larger transmittance, during black voltage application, as the cell thickness is away from 7.0 μm.

This is because, in case of the blue pixel 30B similarly to the case of the red pixel 30R, (i) a first cell thickness which causes a minimum or minimal transmittance during no voltage application and (ii) a second cell thickness which causes a minimum or minimal transmittance during black voltage application do not coincide with each other.

When the transmittance obtained during black voltage application increases, an excess brightness occurs in a black display. This causes a decrease in contrast.

In view of this, the liquid crystal display device 1 of the present embodiment is designed such that (i) a transmittance identical to or lower than a transmittance of the blue pixel 30B which transmittance is obtained during black voltage application in a single-gap structure is secured and (ii) the transmittance obtained during no voltage application is lower than a transmittance obtained during no voltage application in the single-gap structure.

As described earlier, the blue pixel 30B has a minimal transmittance, during black voltage application, at a cell thickness of 7.0 μm, whereas a graph illustrating a relationship between the cell thickness and the transmittance obtained during black voltage application has substantial line symmetry with respect to a straight line defined by the cell thickness=7.0 μm.

Accordingly, for example, in a case of obtaining the transmittance identical to or lower than the transmittance obtained during black voltage application in the single-gap structure in which the green pixel 30O has an optimized cell thickness of 7.2 μm, it is preferable that the cell thickness be within a range of 7.2 μm to a cell thickness (i.e. 6.8 μm) which is symmetrical to 7.2 μm with respect to 7.0 μm.

On the other hand, as described, earlier, the blue pixel 30B has the minimal transmittance, during no voltage application, at the cell thickness of 6.5 μm, and increases as the cell thickness is away from 6.5 μm.

Accordingly, the transmittance obtained during no voltage application increases as the cell thickness increases in the range of 6.8 μm to 7.2 μm which range is preferable for the transmittance obtained during black voltage application.

Accordingly, it is appropriate that the blue pixel 30B have a cell thickness of 6.8 μm which (i) is not less than 6.5 μm at which the blue pixel 30B has a minimum transmittance during no voltage application and (ii) is close to 6.5 μm, from a the perspective that each of the transmittance obtained during black voltage application and the transmittance obtained during no voltage application is set to a low value.

(Optical Characteristic)

The following describes an optical characteristic of the liquid crystal display device 1 in which the respective cell thicknesses of the pixels 30 having the respective colors are set as described above, with reference to FIG. 15.

FIG. 15 is a graph illustrating a relationship between an applied voltage and respective transmittances with respect to light of the respective colors in the liquid crystal display device 1 in which the cell thicknesses of the red pixel 30R, the green pixel 30G, and the blue pixel 30B are set to 7.8 µm, 7.2 µm, and 6.8 µm, respectively.

The liquid crystal display device 1 of the present embodiment allowed retention of a contrast substantially similar to a liquid crystal display device having a single-gap structure (in which a red pixel, a green pixel, and a blue pixel are identical in cell thickness) since the respective transmittances are low during black voltage application.

Furthermore, according to the liquid crystal display device 1 of the present embodiment, it was possible to further reduce the transmittance during no voltage application than the liquid crystal display device having the single-gap structure. This allowed a defective pixel to be less noticeable during display.

(Another Arrangement)

The present invention is not limited to the embodiments above, but can be altered by a skilled person within the scope of the present invention.

For example, according to the red pixel 30R illustrated in FIG. 13, (i) the cell thickness, causing a contrast to be retained (the cell thickness causing a desired low transmittance during black voltage application), was smaller than the cell thickness which causes the minimum transmittance while no voltage is applied (during no voltage application), and (ii) the cell thickness, causing a desired low transmittance during black voltage application, was larger than a reference cell thickness such as the cell thickness of the green pixel 30G.

On the other hand, in a case where the cell thickness causing a desired low value during black voltage application was in a range smaller than the reference cell thickness such as the cell thickness of the green pixel 30G, contrary to the case described above, the cell thickness causing a desired low transmittance during black voltage application can be set to a value causing a minimum transmittance during black voltage application.

Moreover, this is also applied to the blue pixel 30B. Namely, according to the blue pixel 30B illustrated in FIG. 14, (i) the cell thickness, causing a contrast to be retained (the cell thickness causing a desired low transmittance during black voltage application), was larger than the cell thickness which causes the minimum transmittance while no voltage is applied (during no voltage application), and (ii) the cell thickness, causing a desired low transmittance during black voltage application, was smaller than a reference cell thickness such as the cell thickness of the green pixel 30G.

On the other hand, in a case where the cell thickness causing a desired low value during black voltage application was in a range larger than the reference cell thickness such as the cell thickness of the green pixel 30G, contrary to the case described above, the cell thickness causing a desired low transmittance during black voltage application can be set to a value causing a minimum transmittance during black voltage application.

The present invention is not limited to the description of the embodiments above, but may be altered by a skilled person within the scope of the claims. An embodiment based on a proper combination of technical means disclosed in different embodiments is encompassed in the technical scope of the present invention.

Industrial Applicability

A liquid crystal display device of the present invention is preferably usable in an optical high-definition liquid crystal display device which has a large screen including a large number of pixels. This is because the liquid crystal display device of the present invention is arranged such that a defective pixel is less noticeable during display.

The invention claimed is:

1. An OCB liquid crystal display device, comprising:
    first and second substrates provided to face each other;
    a liquid crystal layer provided between the first and second substrates;
    polarizing plates provided on first surfaces of the respective first and second substrates which first surfaces are opposite to respective second surfaces of the first and second substrates which second surfaces face the liquid crystal layer;
    at least one optical compensation film provided between (i) at least one of the first and second substrates and (ii) a corresponding one of the polarizing plates,
    the liquid crystal layer including liquid crystal molecules having a spray orientation in a state where no voltage is applied to the liquid crystal layer, a transition occurring to a bend orientation from the spray orientation in response to application of a voltage to the liquid crystal layer,
    a retardation of the liquid crystal layer obtained while no voltage is applied to the liquid crystal layer falling within ±(a value which is one-tenth of a main wavelength) of a value obtained by adding natural number times the main wavelength to a total retardation of the at least one optical compensation film, and
    wherein the total retardation of the at least one optical compensation film is within ±10% of a retardation of the liquid crystal layer obtained while an ON voltage is being applied to the liquid crystal layer during display.

2. The OCB liquid crystal display device as set forth in claim 1, wherein;
    said at least one of the first and second substrates includes a color filter which includes at least a green color filter, and
    a retardation of the liquid crystal layer in a region corresponding to the green color filter which retardation is obtained while no voltage is applied, falls within ±(a value which is one-tenth of a main wavelength of light which transmits the green color filter) of a value obtained by adding, to the total retardation of the at least one optical compensation film, natural number times the main wavelength of the light which transmits the green color filter.

3. The OCB liquid crystal display device as set forth in claim 2, wherein the main wavelength of the light which transmits the green color filter falls within 542 nm ±10%.

4. The OCB liquid crystal display device as set forth in claim 1, wherein:
    said at least one of the first and second substrates includes a color filter which includes a red color filter, a green color filter, and a blue color filter,
    a retardation of the liquid crystal layer in a region corresponding to the red color filter which retardation is obtained while no voltage is applied, falls within ±(a value which is one-tenth of a main wavelength of light which transmits the red color filter) of a value obtained by adding, to the total retardation of the at least one optical compensation film, natural number times the main wavelength of the light which transmits the red color filter, a retardation of the liquid crystal layer in a region corresponding to the green color filter which retardation is obtained while no voltage is applied, falls within ±(a value which is one-tenth of a main wavelength of light which transmits the green color filter) of a value obtained by adding, to the total retardation of the at least one optical compensation film, natural number times the main wavelength of the light which transmits the green color filter, and a retardation of the liquid crystal layer in a region corresponding to the blue color filter which retardation is obtained while no voltage is applied, falls within ±(a value which is one-tenth of a main wavelength of light which transmits the blue color filter) of a value obtained by adding, to the total retardation of the at least one optical compensation film, natural number times the main wavelength of the light which transmits the blue color filter.

5. The OCB liquid crystal display device as set forth in claim 4, wherein (i) the liquid crystal layer in the region corresponding to the red color filter, (ii) the liquid crystal layer in the region corresponding to the green color filter, and (iii) the liquid crystal layer in the region corresponding to the blue color filter are different in thickness.

6. The OCB liquid crystal display device as set forth in claim 4, wherein (i) the liquid crystal layer in the region corresponding to the red color filter, (ii) the liquid crystal layer in the region corresponding to the green color filter, and (iii) the liquid crystal layer in the region corresponding to the blue color filter constitute one (1) display unit.

7. The OCB liquid crystal display device as set forth in claim 4 wherein the main wavelength of the light which transmits the red color filter falls within 609 nm ±10%.

8. The OCB liquid crystal display device as set forth in claim 4 wherein the main wavelength of the light which transmits the blue color filter falls within 506 nm ±10%.

9. The OCB liquid crystal display device as set forth in claim 1, wherein:

said at least one of the first and second substrates includes a color filter which includes a red color filter, a green color filter, and a blue color filter, a thickness of the liquid crystal layer in a region corresponding to the green color filter is set so that a retardation of the liquid crystal layer in the region corresponding to the green color filter which retardation is obtained while no voltage is applied falls within ±(a value which is one-tenth of a main wavelength of light which transmits the green color filter) of a value obtained by adding, to the total retardation of the at least one optical compensation film, natural number times the main wavelength of the light which transmits the green color filter, a thickness of the liquid crystal layer in a region corresponding to the red color filter falls within ±(a value which is one-tenth of a main wavelength of light which transmits the red color filter) of a value obtained by adding, to the thickness of the liquid crystal layer in the region corresponding to the green color filter, a value which is twice as large as a difference between (i) a thickness causing the liquid crystal layer in the region corresponding to the red color filter to have an extreme transmittance while an ON voltage is being applied to the liquid crystal layer in the region corresponding to the red color filter during display and (ii) the thickness of the liquid crystal layer in the region corresponding to the green color filter, and a thickness of the liquid crystal layer in a region corresponding to the blue color filter falls within ±(a value which is one-tenth of a main wavelength of light which transmits the blue color filter) of a value obtained by subtracting, from the thickness of the liquid crystal layer in the region corresponding to the green color filter, a value which is twice as large as a difference between (i) a thickness causing the liquid crystal layer in the region corresponding to the blue color filter to have an extreme transmittance while an ON voltage is being applied to the liquid crystal layer in the region corresponding to the blue color filter during display and (ii) the thickness of the liquid crystal layer in the region corresponding to the green color filter.

10. The OCB liquid crystal display device as set forth in claim 9, wherein (i) the liquid crystal layer in the region corresponding to the red color filter, (ii) the liquid crystal layer in the region corresponding to the green color filter, and (iii) the liquid crystal layer in the region corresponding to the blue color filter constitute one (1) display unit.

11. The OCB liquid crystal display device as set forth in claim 9 wherein the main wavelength of the light which transmits the red color filter falls within 609 nm ±10%.

12. The OCB liquid crystal display device as set forth in claim 9 wherein the main wavelength of the light which transmits the blue color filter falls within 506 nm 10%.

13. The OCB liquid crystal display device as set forth in claim 1, wherein the respective polarizing plates are provided so that their optical axes cross at right angles.

14. The OCB liquid crystal display device as set forth in claim 1, wherein the main wavelength falls within 542 nm ±10%.

* * * * *